United States Patent
Yang et al.

(10) Patent No.: US 12,048,878 B2
(45) Date of Patent: Jul. 30, 2024

(54) METHOD AND APPARATUS FOR CONTROLLING VIRTUAL OBJECT, DEVICE, STORAGE MEDIUM, AND PROGRAM PRODUCT

(71) Applicant: TENCENT TECHNOLOGY (SHENZHEN) COMPANY LIMITED, Shenzhen (CN)

(72) Inventors: Zefeng Yang, Shenzhen (CN); Jiaqi Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 188 days.

(21) Appl. No.: 17/834,257

(22) Filed: Jun. 7, 2022

(65) Prior Publication Data

US 2022/0297004 A1   Sep. 22, 2022

Related U.S. Application Data

(63) Continuation of application No. PCT/CN2021/125203, filed on Oct. 21, 2021.

(30) Foreign Application Priority Data

Nov. 19, 2020   (CN) .......................... 202011301713.3

(51) Int. Cl.
  *A63F 13/52*   (2014.01)
  *A63F 13/2145*   (2014.01)
  (Continued)

(52) U.S. Cl.
  CPC ............ *A63F 13/52* (2014.09); *A63F 13/533* (2014.09); *A63F 13/57* (2014.09);
  (Continued)

(58) Field of Classification Search
  None
  See application file for complete search history.

(56) References Cited

U.S. PATENT DOCUMENTS

2020/0298104 A1   9/2020   Wang

FOREIGN PATENT DOCUMENTS

| CN | 106104423 A | 11/2016 |
|---|---|---|
| CN | 107132988 A | 9/2017 |

(Continued)

OTHER PUBLICATIONS

YouTube video, "How to use Sliding In PUBG Mobile Team Deathmatch", https://www.youtube.com/watch?v=ICYfbuATH84 to Muzammil VagoZz Gaming, Oct. 16, 2019 (Year: 2019).*

(Continued)

*Primary Examiner* — Damon J Pierce
(74) *Attorney, Agent, or Firm* — Crowell & Moring LLP

(57) ABSTRACT

This application provides a method and apparatus for controlling a virtual object, a device, a computer-readable storage medium, and a computer program product. The method includes displaying, in a picture of a virtual scene, a virtual object moving in a first motion state and a switching control for switching a motion state of the virtual object; in response to a state switching operation triggered based on the switching control, controlling the virtual object to switch from the first motion state to a second motion state; and in response to a direction adjustment operation triggered based on the switching control, adjusting a motion perspective of the virtual object, and adjusting the picture of the virtual scene corresponding to the adjusted motion perspective, to control the virtual object to move in the second motion state in the adjusted picture of the virtual scene.

20 Claims, 20 Drawing Sheets

(51) Int. Cl.
    *A63F 13/533*    (2014.01)
    *A63F 13/57*     (2014.01)
    *G06F 3/04815*   (2022.01)
    *G06F 3/0488*    (2022.01)

(52) U.S. Cl.
    CPC ........ *G06F 3/04815* (2013.01); *G06F 3/0488* (2013.01); *A63F 13/2145* (2014.09); *A63F 2300/308* (2013.01); *A63F 2300/66* (2013.01)

(56) References Cited

FOREIGN PATENT DOCUMENTS

| | | |
|---|---|---|
| CN | 108355352 A | 8/2018 |
| CN | 108654085 A | 10/2018 |
| CN | 109364475 A | 2/2019 |
| CN | 109960558 A | 7/2019 |
| CN | 110124314 A | 8/2019 |
| CN | 110465073 A | 11/2019 |
| CN | 110665226 A | 1/2020 |
| CN | 111399639 A | 7/2020 |
| CN | 112416196 A | 2/2021 |
| EP | 2 383 027 A2 | 11/2011 |
| JP | 2011-229716 A | 11/2011 |
| JP | 2011-229716 A | 11/2011 |
| JP | 2019-201851 A | 11/2019 |
| JP | 2019-201851 A | 11/2019 |
| KR | 10-2006-0082849 | 7/2006 |

OTHER PUBLICATIONS

YouTube video, "How To Tilt Scope in PUBG Mobile | PUBG Tricks", https://www.youtube.com/watch?v=kPcS9gdAVLM to Faheem Mushtaq, Nov. 16, 2018 (Year: 2018).*
Japanese Office Action with English translation regarding 2022-563072 dated Nov. 10, 2023.
International Search Report with English translation and Written Opinion regarding PCT/CN2021/125203 dated Jan. 19, 2022, 11 pages.
First Chinese Office Action with English concise explanation regarding 202011301713.3 dated Oct. 15, 2021, 10 pages.
Second Chinese Office Action with English concise explanation regarding 202011301713.3 dated Apr. 15, 2022, 5 pages.
Office action in Korean application No. 10-2022-7017838, dated May 7, 2024, 20 pages (with English translation).

* cited by examiner

METHOD AND APPARATUS FOR CONTROLLING VIRTUAL OBJECT, DEVICE, STORAGE MEDIUM, AND PROGRAM PRODUCT

RELATED APPLICATION

This application is a continuation application of PCT Patent Application No. PCT/CN2021/125203, filed on Oct. 21, 2021, which claims priority to Chinese Patent Application No. 202011301713.3 filed on Nov. 19, 2020, both of which are incorporated herein by reference in their entireties.

FIELD OF THE TECHNOLOGY

This application relates to the field of computer technologies, and in particular, to a method and apparatus for controlling a virtual object, a device, a computer-readable storage medium, and a computer program product.

BACKGROUND OF THE DISCLOSURE

Display technologies based on graphics processing hardware expand channels for perceiving environments and obtaining information, especially display technologies for virtual scenes, which can realize diversified interactions between virtual objects controlled by users or artificial intelligence according to practical application requirements, and have various typical application scenarios. For example, in virtual scenes of military exercise simulation, games, and the like, a real battle process between virtual objects can be simulated.

In the related art, a user may control, through a terminal, a virtual object located in a virtual scene to perform activities, for example, control the virtual object to move in the virtual scene, and switch a motion state of the virtual object. When it is necessary to control the virtual object to perform motion state switching and motion perspective adjustment, the user needs to trigger different controls, for example, implementing motion state switching by triggering a switching control, and implementing motion perspective adjustment by performing a screen slide operation in a perspective adjustment region. As a result, the whole operation process is complex, and the human-computer interaction efficiency is low.

SUMMARY

Embodiments of this application provide a method and apparatus for controlling a virtual object, a device, a computer-readable storage medium, and a computer program product, which can implement motion state switching and motion perspective adjustment through a switching control, improving the human-computer interaction efficiency.

The present disclosure describes a method for controlling a virtual object. The method includes displaying, by a device, in a picture of a virtual scene, a virtual object moving in a first motion state and a switching control for switching a motion state of the virtual object. The device includes a memory storing instructions and a processor in communication with the memory. The method also includes in response to a state switching operation triggered based on the switching control, controlling, by the device, the virtual object to switch from the first motion state to a second motion state; and in response to a direction adjustment operation triggered based on the switching control, adjusting, by the device, a motion perspective of the virtual object, and adjusting the picture of the virtual scene corresponding to the adjusted motion perspective, to control the virtual object to move in the second motion state in the adjusted picture of the virtual scene.

The present disclosure describes an apparatus for controlling a virtual object. The apparatus includes a memory storing instructions; and a processor in communication with the memory. When the processor executes the instructions, the processor is configured to cause the apparatus to perform: displaying, in a picture of a virtual scene, a virtual object moving in a first motion state and a switching control for switching a motion state of the virtual object, in response to a state switching operation triggered based on the switching control, controlling the virtual object to switch from the first motion state to a second motion state, and in response to a direction adjustment operation triggered based on the switching control, adjusting a motion perspective of the virtual object, and adjusting the picture of the virtual scene corresponding to the adjusted motion perspective, to control the virtual object to move in the second motion state in the adjusted picture of the virtual scene.

The present disclosure describes a non-transitory computer-readable storage medium, storing computer-readable instructions. The computer-readable instructions, when executed by a processor, are configured to cause the processor to perform: displaying, in a picture of a virtual scene, a virtual object moving in a first motion state and a switching control for switching a motion state of the virtual object, in response to a state switching operation triggered based on the switching control, controlling the virtual object to switch from the first motion state to a second motion state, and in response to a direction adjustment operation triggered based on the switching control, adjusting a motion perspective of the virtual object, and adjusting the picture of the virtual scene corresponding to the adjusted motion perspective, to control the virtual object to move in the second motion state in the adjusted picture of the virtual scene.

The technical solutions of the embodiments of this application are also implemented as follows.

An embodiment of this application provides a method for controlling a virtual object, including:

displaying, in a picture of a virtual scene, a virtual object moving in a first motion state and a switching control for switching a motion state of the virtual object;

controlling the virtual object to switch from the first motion state to a second motion state in response to a state switching operation triggered based on the switching control; and adjusting, in a process of the virtual object moving in the second motion state, a motion perspective of the virtual object in response to a direction adjustment operation triggered based on the switching control, and displaying a picture of the virtual scene corresponding to the adjusted motion perspective along with the adjustment of the motion perspective, to control the virtual object to move in the second motion state in the picture of the virtual scene corresponding to the adjusted motion perspective.

An embodiment of this application provides an apparatus for controlling a virtual object, including:

a display module, configured to display, in a picture of a virtual scene, a virtual object moving in a first motion state and a switching control for switching a motion state of the virtual object;

a control module, configured to control the virtual object to switch from the first motion state to a second motion state in response to a state switching operation triggered based on the switching control; and an adjustment module, configured to adjust, in a process of the virtual object moving in the second motion state, a motion perspective of the virtual object in response to a direction adjustment operation triggered based on the switching control, and display a picture of the virtual scene corresponding to the adjusted motion perspective along with the adjustment of the motion perspective, to control the virtual object to move in the second motion state in the picture of the virtual scene corresponding to the adjusted motion perspective.

An embodiment of this application provides a computer device, including:

a memory, configured to store executable instructions; and a processor, configured to implement, when executing the executable instructions stored in the memory, the method for controlling a virtual object provided in the embodiments of this application.

An embodiment of this application provides a computer-readable storage medium, storing executable instructions, the executable instructions, when executed by a processor, being configured to implement the method for controlling a virtual object provided in the embodiments of this application.

An embodiment of this application provides a computer program product, including a computer program or instructions, the computer program or the instructions, when executed by a processor, implementing the method for controlling a virtual object provided in the embodiments of this application.

The embodiments of this application have the following beneficial effects:

By using the embodiments of this application, the virtual object is controlled to switch from the first motion state to a second motion state in response to a state switching operation triggered based on the switching control; and in a process of the virtual object moving in the second motion state, a motion perspective of the virtual object is adjusted in response to a direction adjustment operation triggered based on the switching control. The switching control provided in the embodiments of this application has two functions, that is, one control can be used to implement both the motion state switching and the motion perspective switching. Therefore, in one aspect, compared to setting two different controls and implementing the motion state switching and the motion perspective switching respectively through the two controls, the embodiments of this application save the computing resources and display resources of the computer device, and make the display interface more concise. In another aspect, the user can implement the motion state switching and the motion perspective switching based on one control, which simplifies the user operation and can improve the human-computer interaction efficiency.

DESCRIPTION OF EMBODIMENTS

Figure 1:
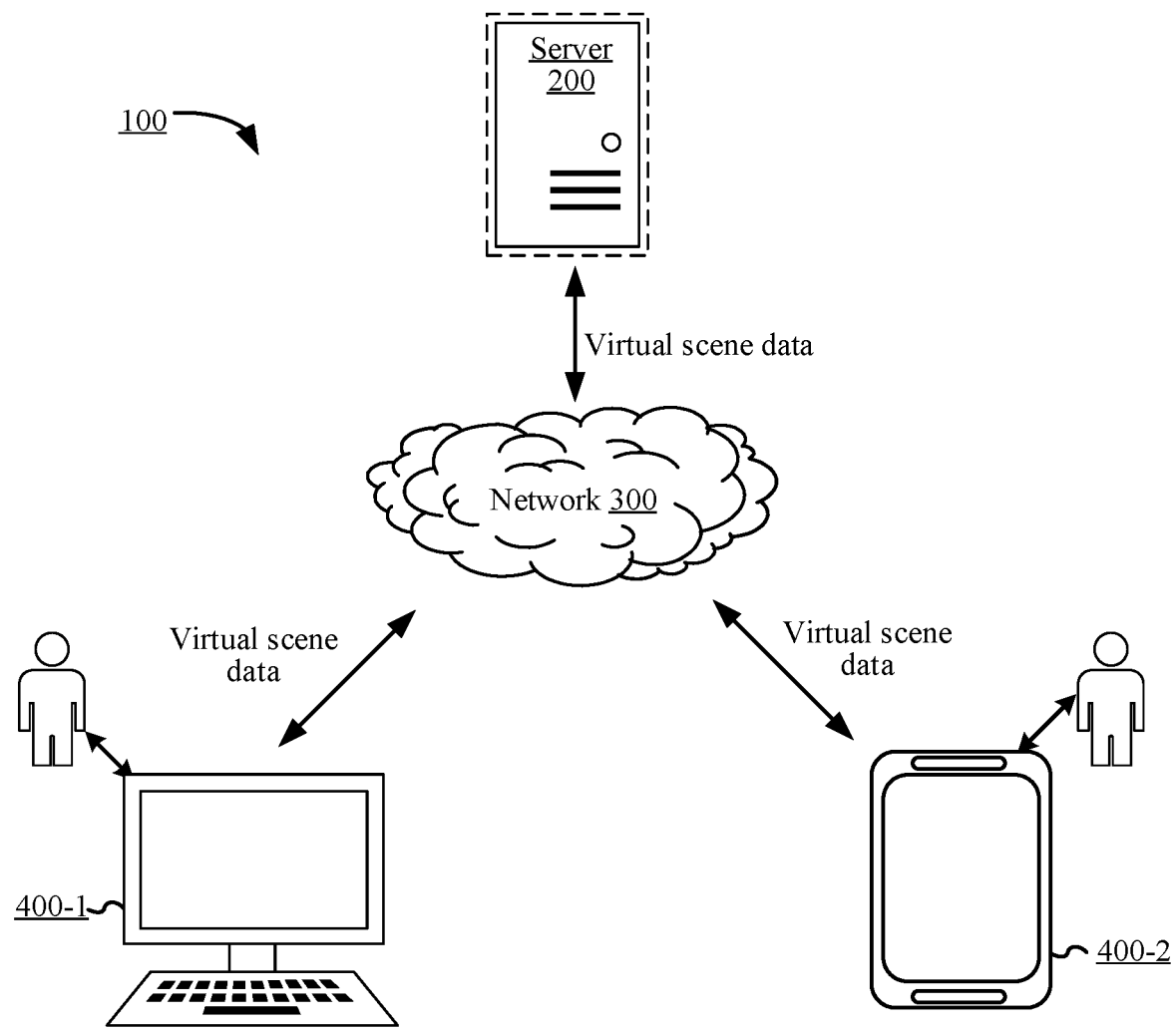
FIG. 1 is a schematic diagram of an implementation scenario of a method for controlling a virtual object according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second, or the like" is merely intended to distinguish similar objects but does not necessarily indicate a specific order of an object. It may be understood that "first/second, or the like" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, nouns and terms involved in the embodiments of this application are described. The nouns and terms provided in the embodiments of this application are applicable to the following explanations.

1) Client: It is an application running on a terminal to provide various services, such as a video playback client or a game client.

2) In response to: It is used for representing a condition or status on which one or more operations to be performed depend. When the condition or status is satisfied, the one or more operations may be performed immediately or after a set delay. Unless explicitly stated, there is no limitation on the order in which the plurality of operations are performed.

3) Virtual scene: It is a virtual scene displayed (or provided) by an application when run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this application. For example, the virtual scene may include the sky, the land, the ocean, or the like. The land may include environmental elements such as the desert and a city. The user may control the virtual object to move in the virtual scene.

4) Virtual object: Virtual objects are images of various people and things that can interact in a virtual scene, or movable objects in the virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

Optionally, the virtual object may be a player character controlled through an operation on a client, or an artificial intelligence (AI) character set in a virtual scene battle through training, or a non-player character (NPC) set in a virtual scene for interaction. Optionally, the virtual object may be a virtual character for performing adversarial interaction in a virtual scene. Optionally, a quantity of virtual objects participating in the interaction in the virtual scene may be preset, or may be dynamically determined according to a quantity of clients participating in the interaction.

For example, in a shooting game, the user may control the virtual object to descend freely, glide, parachute, or the like in the sky of the virtual scene, or run, jump, crawl, stoop to move forward, or the like on the land, or swim, float, dive, or the like in the ocean. Certainly, the user may alternatively control the virtual object to drive a virtual vehicle to move in the virtual scene. For example, the virtual vehicle may be a virtual car, a virtual aircraft, a virtual yacht, or the like.

Herein, the foregoing scene is merely used as an example for description, which is not specifically limited in the embodiments of this application. The user may alternatively control the virtual object to perform adversarial interaction with other virtual objects through a virtual item. For example, the virtual item may be a throwing virtual item such as grenades, cluster mines, and sticky grenades, or a shooting virtual item such as machine guns, pistols, and rifles. The type of the virtual item is not specifically limited in this application.

5) Scene data: It represents various features of an object in a virtual scene during interaction, for example, may include a position of the object in the virtual scene. Certainly, different types of features may be included according to the type of the virtual scene. For example, in a virtual scene of a game, scene data may include waiting times for various functions configured in the virtual scene (depending on a quantity of times a same function can be used in a specific time), and may further represent attribute values of various states of a game character, such as a hit point value (also referred to as a red value), and a magic value (also referred to as a blue value).

FIG. 1 is a schematic diagram of an implementation scenario of a method for controlling a virtual object according to an embodiment of this application. To support an exemplary application, terminals (where a terminal 400-1 and a terminal 400-2 are shown as an example) is connected to a server 200 by using a network 300. The network 300 may be a wide area network, a local area network, or a combination of thereof. Data transmission is implemented by using a radio link.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in the embodiments of this application.

In practical implementations, an application supporting a virtual scene is installed and run on the terminal. The application may be any one of a first-person shooting game (FPS) game, a third-person shooting game, a MOBA game, a virtual reality application, a three-dimensional map program, a military simulation program, or a multiplayer gunfight survival game. The user uses the terminal to operate and control a virtual object in a virtual scene to perform activities. The activities include, but not limited to, at least one of adjusting body postures, crawling, walking, running, riding, jumping, driving, picking, shooting, attacking, and throwing. For example, the virtual object is a virtual character such as a simulated character role or a cartoon character role.

In an exemplary scenario, a first virtual object controlled by the terminal 400-1 and a second virtual object controlled by the other terminal 400-2 are located in the same virtual scene, and in this case, the first virtual object may interact with the second virtual object in the virtual scene. In some embodiments, the first virtual object and the second virtual object may be in an alliance relationship. For example, the first virtual object and the second virtual object belong to the same team and organization. In the virtual scene, there are also virtual objects in a hostile relationship with the first virtual object. The virtual objects in the hostile relationship may perform adversarial interaction on land by shooting at each other.

In an exemplary scenario, the terminal 400-1 controls a virtual object to move in a virtual scene, displays a picture of the virtual scene observed from a motion perspective of the virtual object on the terminal, and displays, in the picture of the virtual scene, the virtual object moving in a first motion state (for example, a sprinting state) and a switching control for switching a motion state of the virtual object; controls the virtual object to switch from the first motion state to a second motion state (for example, switch from the sprinting state to a sliding tackle state) in response to a state switching operation triggered based on the switching control; and adjusts, in a process of the virtual object moving in the second motion state, a motion perspective of the virtual object in response to a direction adjustment operation triggered based on the switching control, and displays a picture of the virtual scene corresponding to the adjusted motion perspective along with the adjustment of the motion perspective, to control the virtual object to move in the second motion state in the picture of the virtual scene corresponding to the adjusted motion perspective. The picture of the virtual scene includes an object interaction environment, interactive objects, and the like. The picture of the virtual scene is obtained based on virtual scene data.

In an exemplary scenario, in a military virtual simulation application, a virtual scene technology is used to enable trainees to experience a battlefield environment visually and audibly, familiarize themselves with environmental characteristics of a combat region, and interact with objects in the virtual environment through necessary devices. The method of realizing a virtual battlefield environment may be to create a dangerous and almost real three-dimensional battlefield environment through background generation and image synthesis by using a corresponding three-dimensional battlefield environment graphic image library, including a combat background, a battlefield scene, various weapons and equipment, combatants, and the like.

In practical implementations, the terminal 400-1 displays a picture of a virtual scene (for example, a city A) observed from a perspective of a virtual object (for example, a simulated combatant), and displays, in the picture of the virtual scene, the virtual object moving in a first motion state (for example, a sprinting state) and a switching control for switching a motion state of the virtual object; controls the virtual object to switch from the first motion state to a second motion state (for example, switch from the sprinting state to a sliding tackle state) in response to a state switching operation triggered based on the switching control; and adjusts, in a process of the virtual object moving in the second motion state, a motion perspective of the virtual object in response to a direction adjustment operation triggered based on the switching control, and displays a picture of the virtual scene corresponding to the adjusted motion perspective along with the adjustment of the motion perspective, to control the virtual object to move in the second motion state in the picture of the virtual scene corresponding to the adjusted motion perspective.

Figure 2:
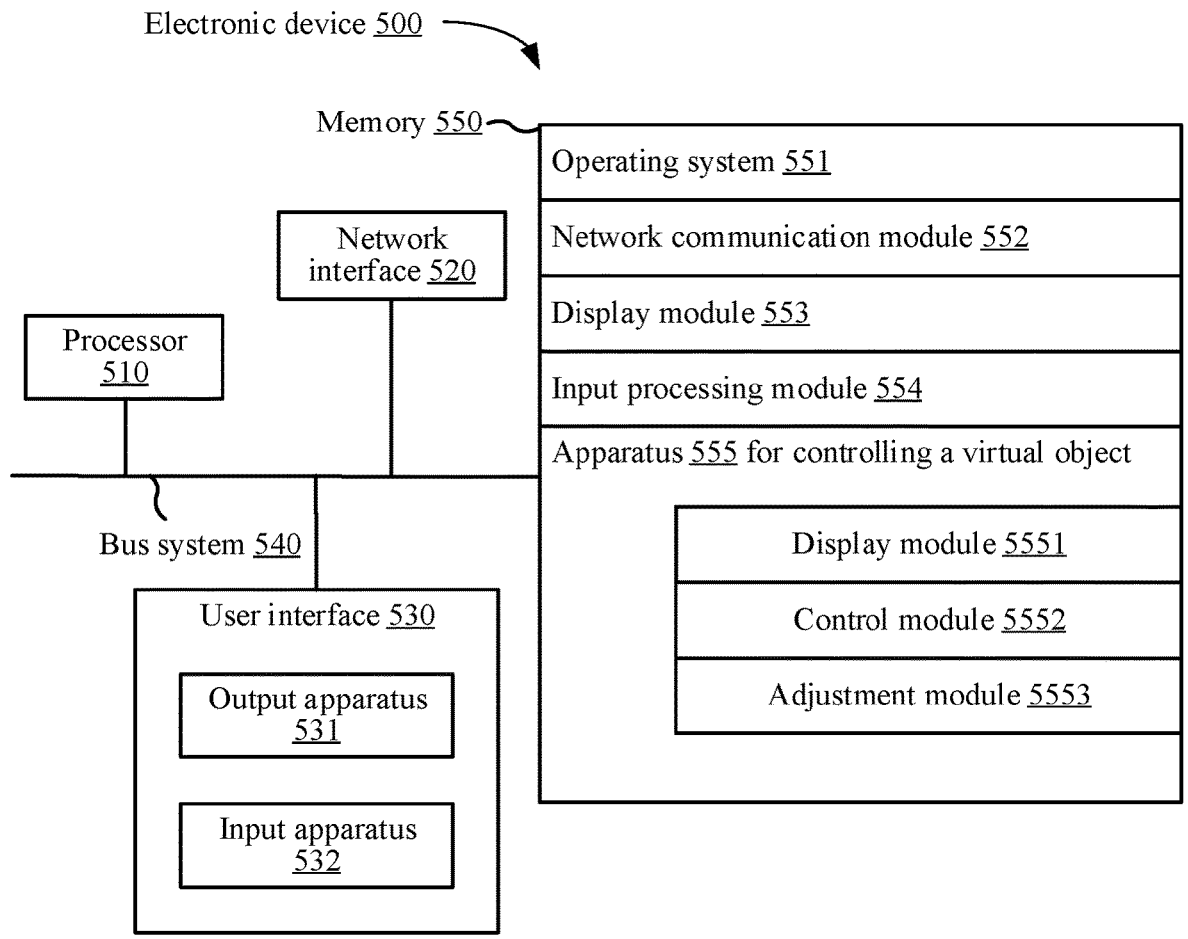
FIG. 2 is a schematic structural diagram of an electronic device 500 according to an embodiment of this application.

FIG. 2 is a schematic structural diagram of an electronic device 500 according to an embodiment of this application. In practical applications, the electronic device 500 may be the terminal 400-1, the terminal 400-2, or the server 200 in FIG. 1. The computer device implementing the method for controlling a virtual object of the embodiments of this application is described by taking the electronic device being the terminal 400-1 shown in FIG. 1 as an example. The electronic device 500 shown in FIG. 2 includes at least one processor 510, a memory 550, at least one network interface 520, and a user interface 530. All the components in the electronic device 500 are coupled together by using a bus system 540. It may be understood that the bus system 540 is configured to implement connection and communication between these assemblies. In addition to a data bus, the bus system 540 further includes a power bus, a control bus, and a status signal bus. However, for ease of clear description, all types of buses are labeled as the bus system 540 in FIG. 2.

The processor 510 may be an integrated circuit chip having a signal processing capability, for example, a general purpose processor, a DSP, or another PLD, discrete gate, transistor logical device, or discrete hardware component. The general purpose processor may be a microprocessor, any conventional processor, or the like.

The user interface 530 includes one or more output apparatuses 531 that can display media content, including one or more loudspeakers and/or one or more visual display screens. The user interface 530 further includes one or more input apparatuses 532, including user interface components that facilitate inputting of a user, such as a keyboard, a mouse, a microphone, a touch display screen, a camera, and other input button and control.

The memory 550 may be a removable memory, a non-removable memory, or a combination thereof. Exemplary hardware devices include a solid-state memory, a hard disk drive, an optical disc driver, or the like. The memory 550 optionally includes one or more storage devices physically away from the processor 510.

The memory 550 includes a volatile memory or a non-volatile memory, or may include both a volatile memory and a non-volatile memory. The non-volatile memory may be a read-only memory (ROM). The volatile memory may be a random access memory (RAM). The memory 550 described in this embodiment of this application is to include any other suitable type of memories.

In some embodiments, the memory 550 may store data to support various operations. Examples of the data include a program, a module, and a data structure, or a subset or a superset thereof, which are described below by using examples.

An operating system 551 includes a system program configured to process various basic system services and perform a hardware-related task, such as a framework layer, a core library layer, or a driver layer, and is configured to implement various basic services and process a hardware-based task.

A network communication module 552 is configured to reach another computing device through one or more (wired or wireless) network interfaces 520. Exemplary network interfaces 520 include: Bluetooth, wireless compatible authentication (Wi-Fi), a universal serial bus (USB), and the like.

A display module 553 is configured to display information by using an output apparatus 531 (for example, a display screen or a speaker) associated with one or more user interfaces 530 (for example, a user interface configured to operate a peripheral device and display content and information).

An input processing module 554 is configured to detect one or more user inputs or interactions from one of the one or more input apparatuses 532 and translate the detected input or interaction.

In some embodiments, an apparatus for controlling a virtual object provided in the embodiments of this application may be implemented by using software. FIG. 2 shows an apparatus 555 for controlling a virtual object stored in the memory 550. The apparatus may be software in a form such as a program and a plug-in, and includes the following software modules: a display module 5551, a control module 5552, and an adjustment module 5553. These modules are logical modules, and may be randomly combined or further divided based on a function to be performed. The following describes functions of the modules.

In some other embodiments, the apparatus for controlling a virtual object provided in the embodiments of this application may be implemented by using hardware. For example, the apparatus for controlling a virtual object provided in the embodiments of this application may be a processor in a form of a hardware decoding processor, programmed to perform the method for controlling a virtual object provided in the embodiments of this application. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

Next, the method for controlling a virtual object provided in the embodiments of this application is described. In practical implementations, the method for controlling a virtual object provided in the embodiments of this application may be implemented by a server or a terminal alone, or may be implemented jointly by a server and a terminal.

Figure 3:
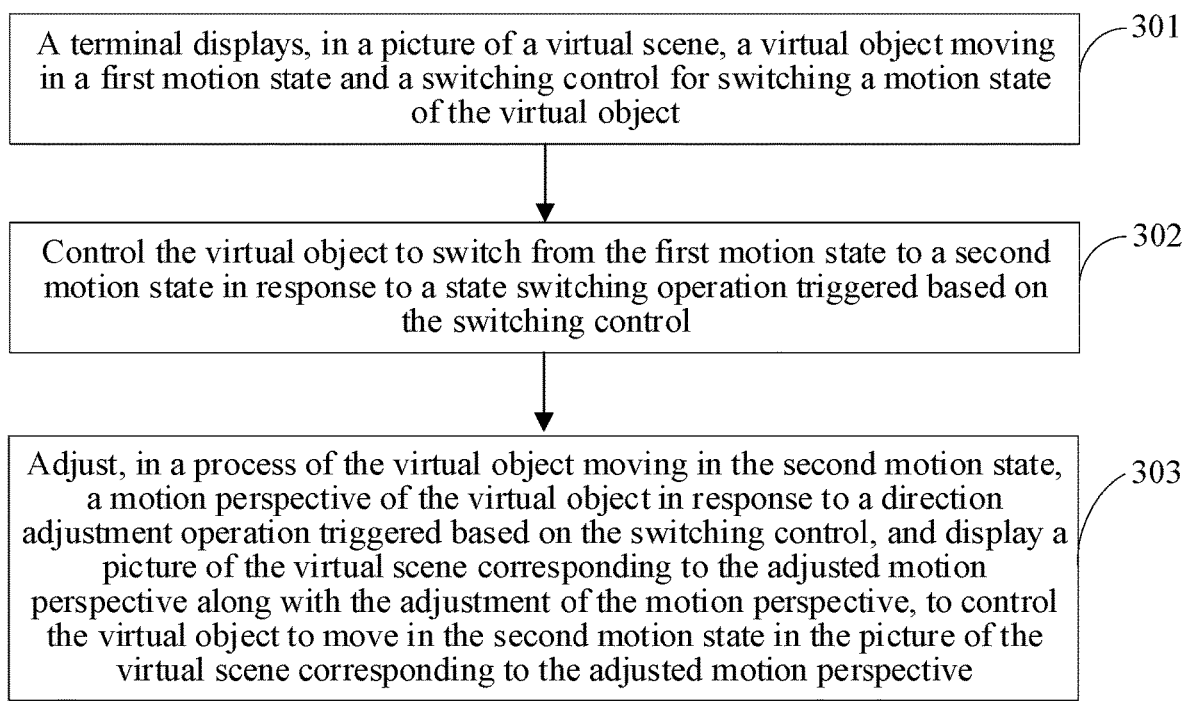
FIG. 3 is a schematic flowchart of a method for controlling a virtual object according to an embodiment of this application.

FIG. 3 is a schematic flowchart of a method for controlling a virtual object according to an embodiment of this application. A description is made with reference to the steps shown in FIG. 3.

Step 301: A terminal displays, in a picture of a virtual scene, a virtual object moving in a first motion state and a switching control for switching a motion state of the virtual object.

In practical implementations, an application supporting the virtual scene is installed on the terminal. The application may be any one of a first-person shooting game, a third-person shooting game, a MOBA game, a virtual reality application, a three-dimensional map program, a military simulation program, or a multiplayer gunfight survival game. The user may use the terminal to operate a virtual object in a virtual scene to perform activities. The activities include, but not limited to, at least one of adjusting body postures, crawling, walking, running, riding, jumping, driving, picking, shooting, attacking, and throwing. For example, the virtual object is a virtual character such as a simulated character role or a cartoon character role.

When a player opens an application on the terminal and the terminal runs the application, the terminal displays a picture of a virtual scene. The picture of the virtual scene is observed from a first-person perspective or a third-person perspective. The picture of the virtual scene includes interactive objects and an object interaction environment. For example, a first virtual object and a second virtual object in a hostile relationship interact in the virtual scene.

In practical implementations, the motion state of the virtual object may be a walking state, a running state, a sprinting state, a crawling state, a jumping state, a sliding tackle state, etc. The first motion state may be any of the foregoing motion states. In addition, the first motion state may be alternatively a static state. The motion state of the virtual object is not specifically limited in this application.

For example, the virtual object is a virtual character such as a simulated character role or a cartoon character role. The virtual object may be in any of the foregoing motion states. The switching control realizes the switching of the motion state, for example, switching from the sprinting state to the sliding tackle state.

In some embodiments, before displaying the virtual object moving in the first motion state, the terminal may further display a direction joystick control in the picture of the virtual scene; determine, in response to a drag operation for the direction joystick control, a drag distance of the drag operation; and control the virtual object to move in the first motion state in a case that the drag distance reaches a target distance.

In practical implementations, the terminal obtains a start position and an end position at which the user triggers the drag operation, where the start position (that is, a position at which the user touches the direction joystick) and the end position (that is, a position at which the user releases the direction joystick) of the drag operation may be recorded in the form of coordinates; determines the drag distance of the drag operation based on the start position and end position; and compares the drag distance and the target distance, and controls the virtual object to move in the first motion state in a case that the drag distance reaches the target distance; otherwise, performs other operations, for example, controlling the virtual object to move in a motion state different from the first motion state, where the target distance is a preset drag distance, which can be set according to the actual situation.

Figure 4:
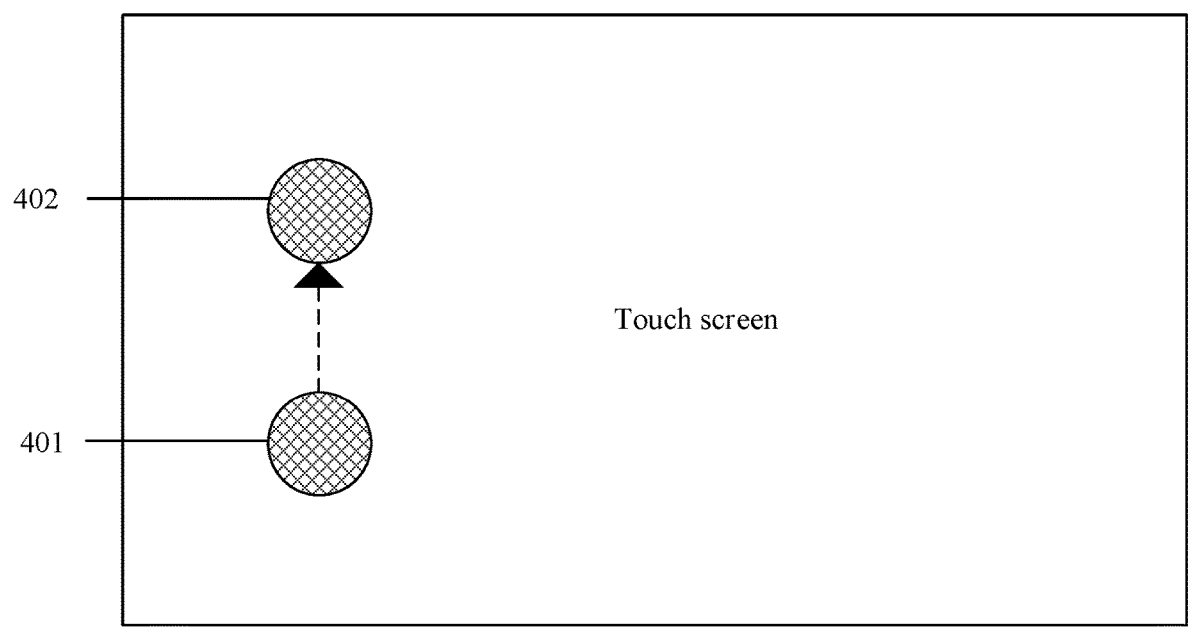
FIG. 4 is a schematic diagram of a drag operation according to an embodiment of this application.

For example, FIG. 4 is a schematic diagram of a drag operation according to an embodiment of this application. Referring to FIG. 4, a start position of the drag operation is 401, an end position of the drag operation is 402, and coordinates (x1, y1) of the start position and coordinates (x2, y2) of the end position are obtained. Based on the coordinates (x1, y1) of the start position and the coordinates (x2, y2) of the end position, a distance between the start position and the end position is calculated, to obtain the drag distance of the drag operation. The drag distance is then compared with the target distance. When it is determined that the drag distance reaches the target distance, the virtual object is controlled to move in the first motion state. In practical applications, indication information for indicating the end position may be further displayed based on the start position. In this way, based on the indication information, the user can accurately and quickly drag the drag joystick to a position at which the virtual object can be controlled to move in the first motion state, which improves interaction efficiency and user experience.

In some implementations, the target distance may be referred as a threshold. The drag distance reaching the target distance may mean that the drag distance is equal to or longer/larger than the target distance (or the threshold). The drag distance not reaching the target distance may mean that the drag distance is shorter than the target distance (or the threshold). In some other implementations, the drag distance reaching the target distance may mean that the drag distance is longer/larger than the target distance (or the threshold). The drag distance not reaching the target distance may mean that the drag distance is not longer/larger than the target distance (or the threshold).

In some embodiments, before displaying the virtual object moving in the first motion state, the terminal may further display a direction joystick control in the picture of the virtual scene; determine, in response to a drag operation for the direction joystick control, a drag direction and a drag distance indicated by the drag operation; and control the virtual object to move in the first motion state in a case that the drag direction is consistent with a target drag direction, and the drag distance reaches the target distance.

Figure 5:
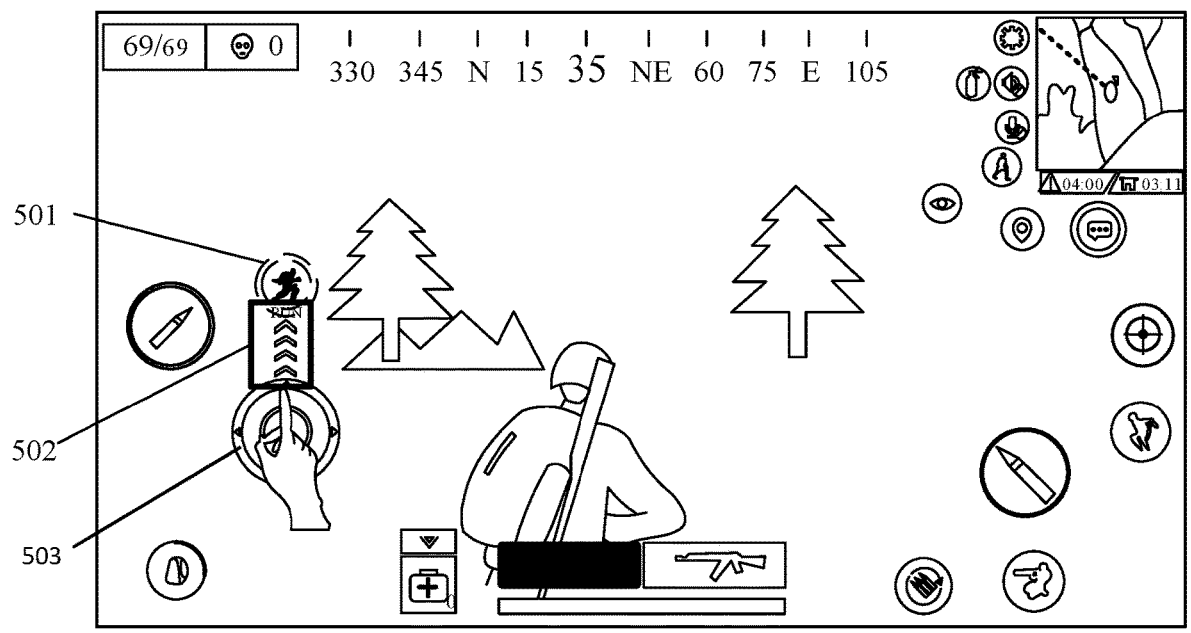
FIG. 5 is a schematic diagram of an interface of a picture of a virtual scene according to an embodiment of this application.

In practical implementations, the target drag direction and the drag distance may be preset, and prompt information corresponding to the target drag direction and the drag distance may be displayed in the picture of the virtual scene to instruct the user to perform a corresponding drag operation. For example, the first motion state being the sprinting state is taken as an example. FIG. 5 is a schematic diagram of an interface of a picture of a virtual scene according to an embodiment of this application. Referring to FIG. 5, a direction joystick control and prompt information are displayed in a picture of a virtual scene. The prompt information includes an arrow 502 and a sprint icon 501. The arrow 502 is used to indicate a target drag direction, and the arrow 502 and the sprint icon 501 are used to jointly indicate a target distance, that is, a distance from a direction joystick control 503 along a direction indicated by the arrow to the sprint icon 501 is the target distance. In this way, based on the prompt information, the user can accurately and quickly drag the drag joystick in a specified direction to a position at which the virtual object can be controlled to move in the first motion state, which improves the interaction efficiency and the user experience.

Figure 12:
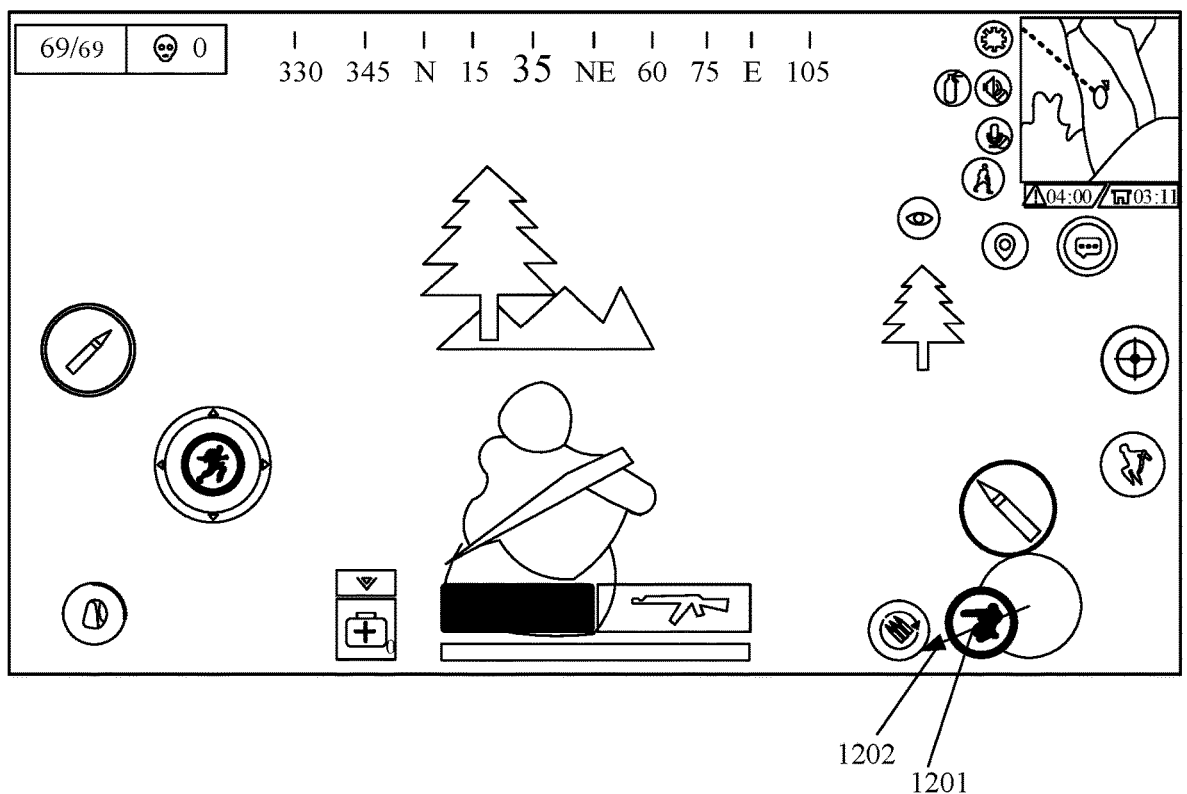
FIG. 12 is a schematic diagram of an interface displayed by a switching control according to an embodiment of this application.

In some implementations, under some circumstances (e.g., when the prompt information for a target drag direction is not needed), the sprint icon 501 may be disposed at a center of the direction joystick control 503 (see an example in FIG. 12). When the prompt information for a target drag direction is needed, the sprint icon 501 may be moved towards the target drag direction, and the arrow 502 is displayed between the sprint icon 501 and the directional joystick control 503 (see an example in FIG. 5). The target drag direction may be indicated by an arrow-pointing direction of the arrow 502. The target distance may be indicated by a length of the arrow 502 or a distance between the direction joystick control 503 and the sprint icon 501.

In some embodiments, before displaying the virtual object moving in the first motion state, the terminal may further display a direction joystick control in the picture of the virtual scene; determine, in response to a drag operation for the direction joystick control, a drag position of the drag operation; and control the virtual object to move in the first motion state in a case that the drag position reaches a target position. The target position is a position used to trigger the virtual object to move in the first motion state. Regardless of a drag direction or a drag path of the direction joystick control, as long as the drag position corresponding to the drag operation reaches the target position, the virtual object can be controlled to move in the first motion state; otherwise, other operations are performed, for example, controlling the virtual object to move in a motion state different from the first motion state.

In some embodiments, a switching control for switching a motion state of the virtual object is displayed only when the virtual object moves in the virtual scene in the first motion state. The switching control herein may be newly displayed, that is, when the virtual object is in a state other than the first motion state and the second motion state, the switching control is not displayed. When the virtual object moves in the virtual scene in the first motion state, the switching control is displayed again. For example, when the virtual object is in a standing state, the switching control is not displayed. When a drag operation for the direction joystick control is received and the drag distance reaches the target distance, the virtual object is controlled to move in a sprinting state, and a switching control for switching the motion state of the virtual object is displayed. Alternatively, the switching control may always be displayed in the picture of the virtual scene. When the virtual object is in the first motion state, the switching control is set to an active state, and the switching control can be triggered only when the virtual object is in the active state.

Figure 6:
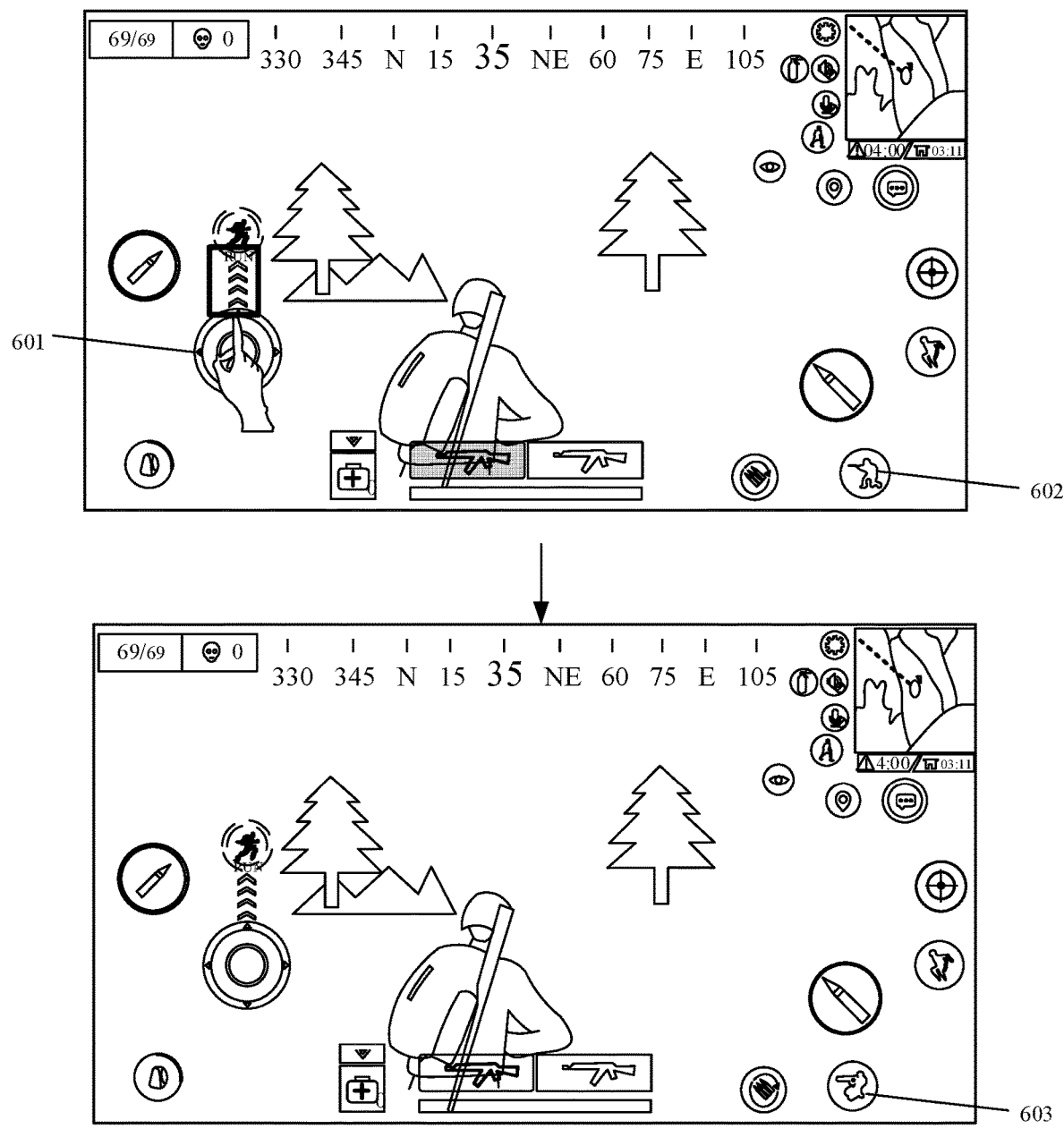
FIG. 6 is a schematic diagram of an interface displayed by a switching control according to an embodiment of this application.

For example, FIG. 6 is a schematic diagram of an interface displayed by a switching control according to an embodiment of this application. Referring to FIG. 6, a direction joystick control 601 is first displayed in a picture of a virtual scene, and when a drag operation for the direction joystick control is received, a drag distance of the drag operation is determined; and a virtual object is controlled to move in a first motion state in a case that the drag distance reaches a target distance, and a squatting button 602 on the picture of the virtual scene is switched to a sliding tackle button 603 (switching control).

In some embodiments, the terminal may further display an achievement of the virtual object in the virtual scene. When the achievement reaches an achievement threshold, a switching control for switching a motion state of the virtual object is displayed. The achievement may be task points obtained by the virtual object doing tasks in the virtual scene, may be an obtained virtual resource value, or may be a motion value achieved by the virtual object moving in a first motion state in the virtual scene, for example, when the first motion state is a walking state, the motion value is a walking distance value achieved in the walking state, or the like. When the achievement of the virtual object in the virtual scene satisfies a condition for switching the motion state of the virtual object, the switching control is displayed on the picture of the virtual scene for the user to trigger the switching control to implement a state switching operation. In this way, to reach the condition that the switching control can be used as soon as possible is beneficial to stimulate the passion of the user for interaction or motion in controlling the virtual object, and can improve the user activity in the virtual scene.

Figure 7:
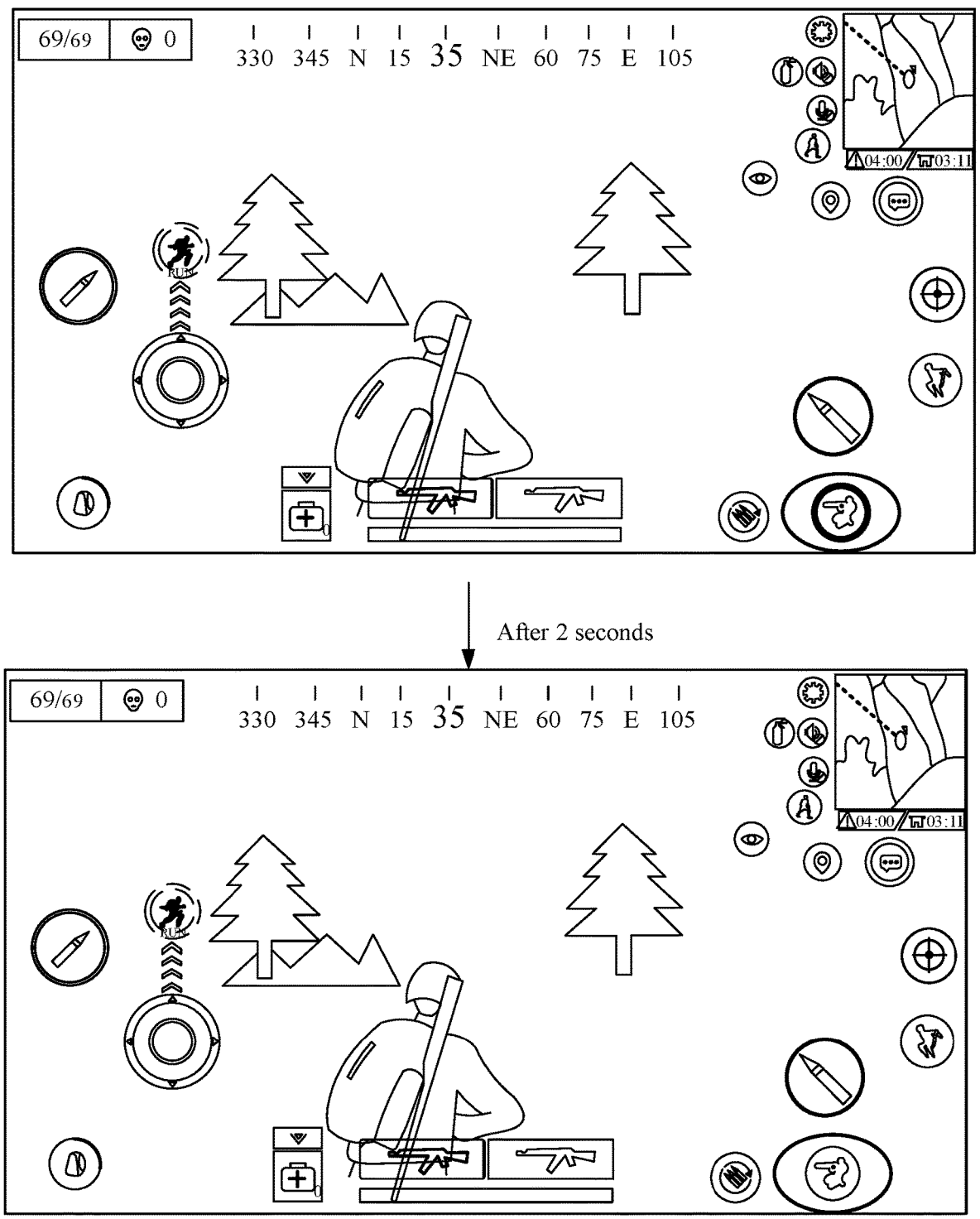
FIG. 7 is a schematic diagram of an interface displayed by a switching control according to an embodiment of this application.

In some embodiments, when the virtual object moves in the virtual scene in the first motion state, the switching control is displayed in a display manner different from other controls, for example, using different display colors, transparency, and other display styles to display the switching control differently, to prompt the user to trigger the switching control. For example, FIG. 7 is a schematic diagram of an interface displayed by a switching control according to an embodiment of this application. Referring to FIG. 7, when a virtual object is switched from an other state to a first motion state, a switching control is displayed, and a breathing light effect corresponding to the switching control is displayed. A display duration of a first display manner may be preset, for example, the display duration is set to 2 seconds. Timing starts from the virtual object switching from the other state to the first motion state, and when 2 seconds are reached, the breathing light effect is canceled. In this way, the switching control is displayed in a prominent display style, so that the user can be isolated from using the switching control, and the display duration of the switching control can be limited, which is conducive to stimulating the user to control the use timing of the switching control, and can improve the user activity in the virtual scene.

Step 302: Control the virtual object to switch from the first motion state to a second motion state in response to a state switching operation triggered based on the switching control. In some implementations, the step 302 may include in response to receiving a state switching operation triggered based on the switching control, controlling the virtual object to switch from the first motion state to a second motion state.

In practical implementations, the state switching operation may be operations such as clicking/tapping, long-pressing, double-clicking/tapping, and sliding for the switching control, which is not limited herein. The second motion state herein is different from the first motion state. For example, when the first motion state is a walking state, the second motion state may be a jumping state.

In some embodiments, the state switching operation may be triggered in the following manner: receiving a press operation for the switching control, and using the press operation as the state switching operation. Correspondingly, after controlling the virtual object to switch from the first motion state to the second motion state, the terminal may further control the virtual object to be in the second motion state before the press operation is released, and control the virtual object to switch from the second motion state to the first motion state in a case that the press operation is released.

In practical implementations, the state switching operation may be a press operation. The terminal monitors the press operation of the user. When the user touches the switching control, the terminal controls the virtual object to switch from the first motion state to the second motion state, and during the continuation of the press operation, controls the virtual object to move in the virtual scene in the second motion state. When the user releases the press operation, that is, when the hand of the user leaves the screen, the virtual object is controlled to switch from the second motion state back to the first motion state.

Figure 8:
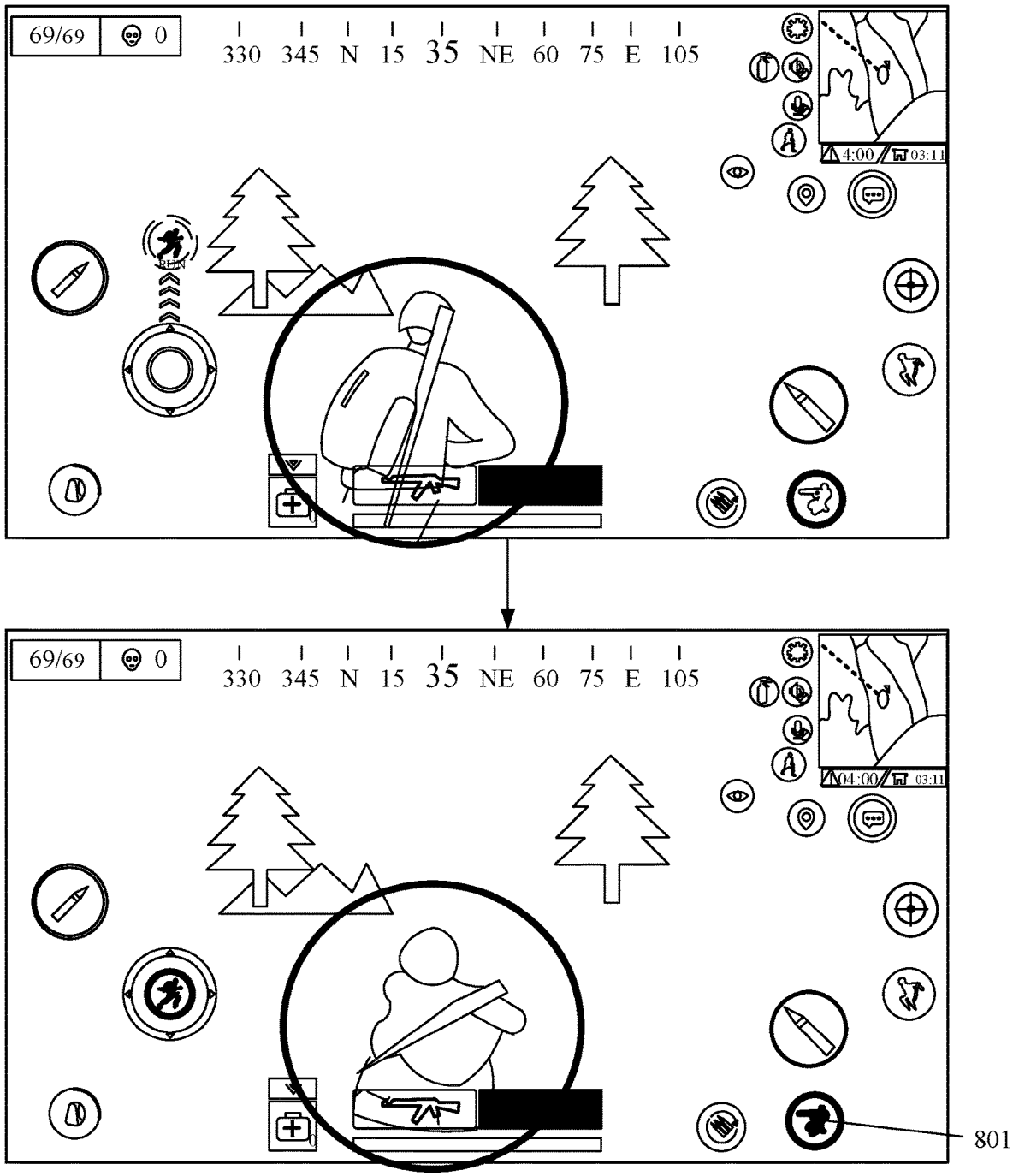
FIG. 8 is a schematic diagram of an interface displayed by a switching control according to an embodiment of this application.

After receiving the press operation for the switching control, the terminal displays the switching control in a target display manner to indicate that the switching control is triggered. For example, before the press operation, the switching control is displayed in grayscale, and after the press operation, the switching control may be displayed in a highlighted form. FIG. 8 is a schematic diagram of an interface displayed by a switching control according to an embodiment of this application. Referring to FIG. 8, during the time period when the user presses the switching control, a switching control 801 is displayed in the highlighted form, which enriches the display styles of the switching control in different states and improves the user experience.

For example, taking the first motion state being the sprinting state and the second motion state being the sliding tackle state as an example, when the user presses the switching control, the virtual object is controlled to switch from the sprinting state to the sliding tackle state. During the continuation of the user pressing the switching control, the virtual object moves in the sliding tackle state. When the user releases the switching control, the virtual object is controlled to switch from the sliding tackle state to the sprinting state.

In some embodiments, the terminal may trigger the state switching operation in the following manner: receiving a first click/tap operation for the switching control, and using the first click/tap operation as the state switching operation. Correspondingly, after controlling the virtual object to switch from the first motion state to the second motion state, the terminal may further receive a second click/tap operation for the switching control; and control the virtual object to switch from the second motion state to the first motion state in response to the second click/tap operation.

In various embodiments/implementations in the present disclosure, a click or tap operation may be collectively referred as a click operation.

The state switching operation may be a click/tap operation. In this way, after performing the click/tap operation, the user may perform other operations without pressing the switching control all the time, which can improve the human-computer interaction efficiency.

In practical implementations, the terminal monitors the click/tap operation of the user. When the user clicks/taps the switching control, the terminal controls the virtual object to switch from the first motion state to the second motion state, and controls the virtual object to move in the second motion state. In the process of the virtual object moving in the second motion state, the user clicks/taps the switching control again to control the virtual object to switch from the second motion state back to the first motion state.

For example, taking the first motion state being the sprinting state and the second motion state being the sliding tackle state as an example, when the user clicks/taps the switching control for the first time, the virtual object is controlled to switch from the sprinting state to the sliding tackle state, and the virtual object is controlled to move in the sliding tackle state continuously. When the user clicks/taps the switching control again, the virtual object is controlled to switch from the sliding tackle state to the sprinting state.

After receiving the first click/tap operation for the switching control, the terminal displays the switching control in a target display manner to indicate that the switching control is triggered. For example, before the press operation, the switching control is displayed in grayscale, and after the press operation, the switching control may be displayed in a highlighted form. When receiving the second click/tap operation for the switching control, the terminal cancels the display of the switching control in the target display manner, for example, cancels the highlighting.

In some embodiments, when the state switching operation may be a click/tap operation, a first click/tap operation for the switching control is received, and the terminal controls the virtual object to switch from the first motion state to the second motion state, and controls the virtual object to move in the second motion state. In the process of the virtual object moving in the second motion state, the user clicks/taps the switching control again to control the virtual object to switch from the second motion state to a third motion state.

That is, the switching control herein may be used to implement switching between a plurality of motion states. In this way, one switching control can implement the switching between a plurality of motion states. Compared with the requirement for a switching control to switch each motion state, this manner saves display resources, simplifies user operations, and can improve the human-computer interaction efficiency. For example, when receiving the first click/tap operation for the switching control, the terminal controls the virtual object to switch from the sprinting state to the sliding tackle state; and when receiving the second click/tap operation for the switching control, the terminal controls the virtual object to switch from the sliding tackle state to the walking state.

In some embodiments, the first motion state is a sprinting state, and the second motion state is a sliding tackle state; and the terminal may control the virtual object to switch from the first motion state to the second motion state in the following manner: controlling the virtual object to squat, and slide in a squatting posture in a motion direction of the sprinting state in the virtual scene, so that the virtual object is in the sliding tackle state.

In practical implementations, the terminal may display the process of switching the virtual object from the sprinting state to the sliding tackle state. For example, referring to FIG. 8, after the user triggers the press operation for the switching control, the virtual object is controlled to squat, and slides in the virtual scene in the squatting state, where a slide direction is the same as a motion direction in the sprinting state.

In the sliding tackle state, a body position of the virtual object is closer to the ground than a body position in the normal standing or walking state, to avoid obstacles or enemy attacks by switching to the sliding tackle state.

Step 303: Adjust, in a process of the virtual object moving in the second motion state, a motion perspective of the virtual object in response to a direction adjustment operation triggered based on the switching control, and display a picture of the virtual scene corresponding to the adjusted motion perspective along with the adjustment of the motion perspective, to control the virtual object to move in the second motion state in the picture of the virtual scene corresponding to the adjusted motion perspective. In some implementations, the step 303 may include, in response to receiving a direction adjustment operation triggered based on the switching control, adjusting a motion perspective of the virtual object, and adjusting the picture of the virtual scene corresponding to the adjusted motion perspective, to control the virtual object to move in the second motion state in the adjusted picture of the virtual scene.

In the process of the virtual object moving in the second motion state, the motion perspective of the virtual object may be adjusted. Since the displayed picture of the virtual scene is observed from the motion perspective of the virtual object, in the process of adjusting the motion perspective of the virtual object, the picture of the virtual scene displayed also changes correspondingly.

In practical implementations, the direction adjustment operation may be operations such as clicking/tapping, long-pressing, double-clicking/tapping, and sliding, which is not limited herein. The direction adjustment operation may be different from the state switching operation. For example, when the state switching operation is a click/tap operation, the direction adjustment operation may be a slide operation.

In some embodiments, the terminal may trigger the direction adjustment operation in the following manner: controlling the switching control to be in a floating state; and receiving a drag operation for the switching control in the floating state, and using the drag operation as the direction adjustment operation.

In practical implementations, an initial state of the switching control may be a state fixed in the picture of the virtual scene. When the user triggers the state switching operation, the switching control is controlled to be in a floating state, so that the user can perform the drag operation for the switching control. For example, when the state switching operation is a long-press operation for the switching control, and a duration of long-pressing the switching control reaches a target duration (for example, 2 seconds), the switching control is controlled to be in the floating state. When the switching control is in the floating state, after the drag operation for the switching control is received, the switching control moves with the execution of the drag operation. The drag operation is used as a direction adjustment operation herein, and a direction indicated by the drag operation is consistent with a direction of perspective adjustment. For example, the motion perspective is adjusted at a target rotation speed. When the direction indicated by the drag operation is to the right, the motion perspective is rotated to the right at the target rotation speed, to synchronously adjust the displayed picture of the virtual scene based on the motion perspective.

Figure 9:
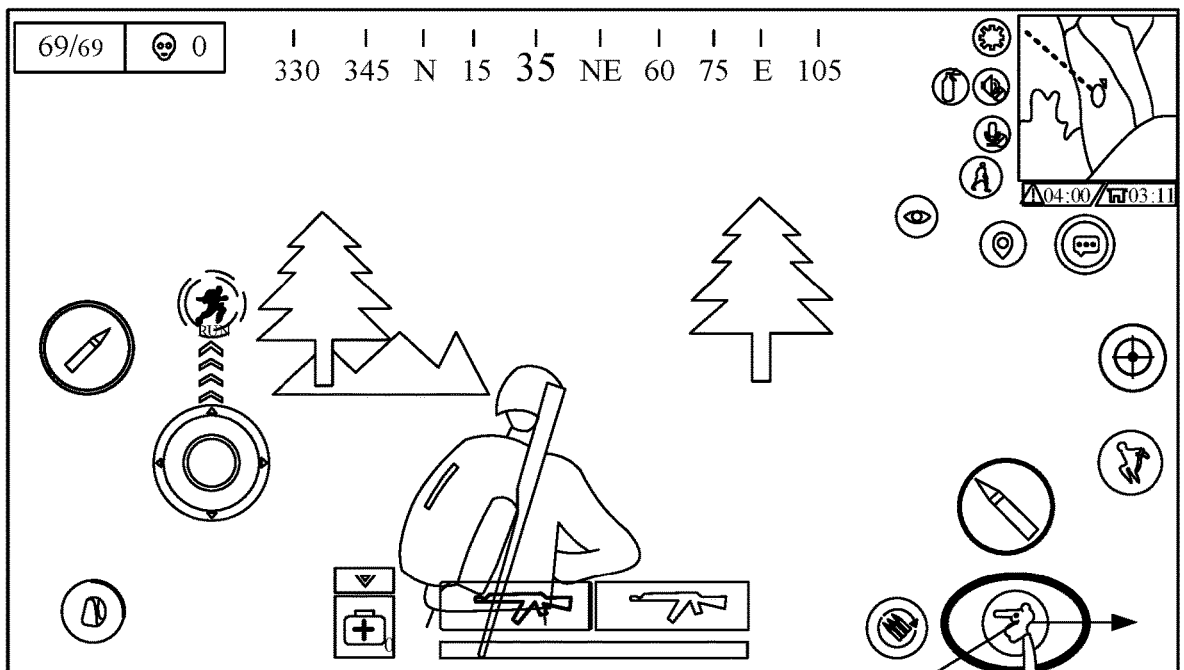
FIG. 9 is a schematic diagram of an interface displayed by a switching control according to an embodiment of this application.
Figure 9:
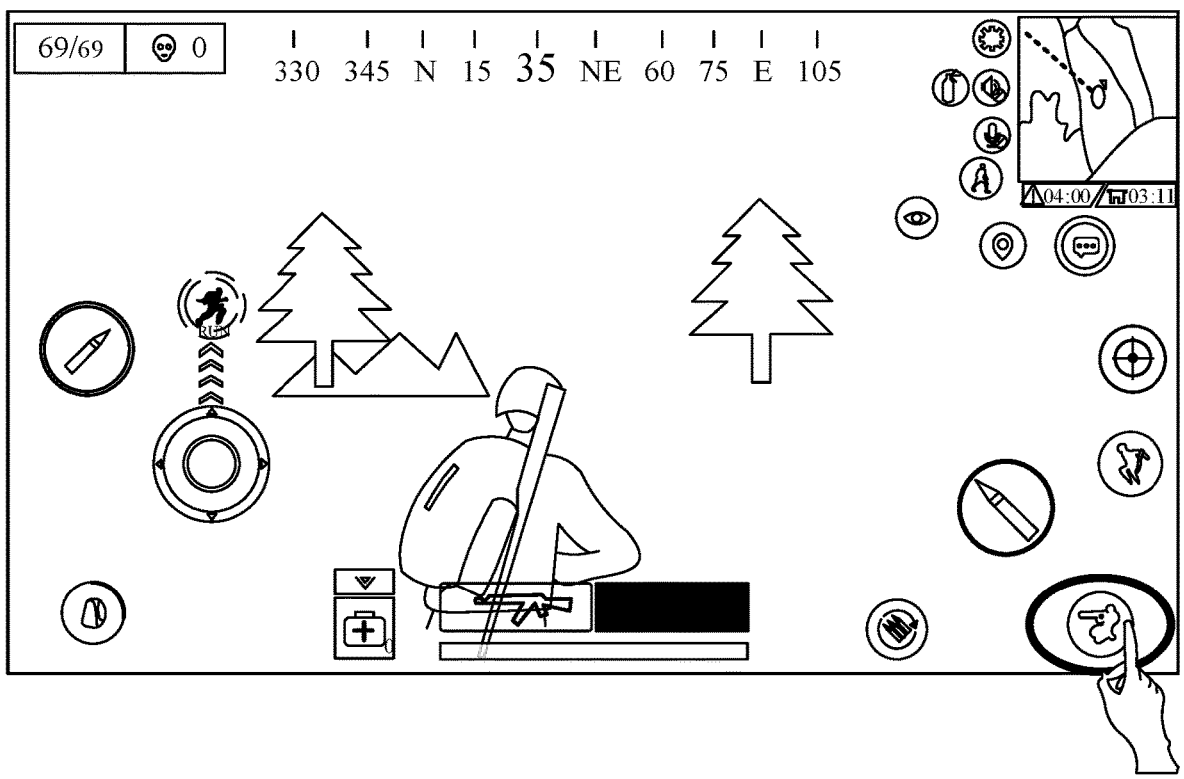

For example, FIG. 9 is a schematic diagram of an interface displayed by a switching control according to an embodiment of this application. Referring to FIG. 9, a switching control 901 is displayed in a picture of a virtual scene. When a press operation for the switching control is received, the switching control is controlled to be in a floating state, so that the switching control in the floating state can be dragged by the user. When a drag operation for the switching control is received, the position of the switching control is adjusted, and the displayed picture of the virtual scene is adjusted.

In some embodiments, after completing the drag operation, that is, after the user releases the switching control, the terminal may further control the switching control to move back to an initial position, and switch the switching control to an initial state.

In some embodiments, the initial state of the switching control may be a floating state. The user may first trigger the state switching operation, and then trigger the direction adjustment operation. For example, when the state switching operation is a click/tap operation for the switching control, after receiving the click/tap operation for the switching control, the terminal controls the virtual object to switch from the first motion state to the second motion state. After receiving the drag operation for the switching control, the terminal adjusts the motion perspective of the virtual object, and displays a picture of the virtual scene corresponding to the adjusted motion perspective along with the adjustment of the motion perspective.

In some embodiments, the terminal may display the switching control for switching the motion state of the virtual object in the following manner: when the switching control is a combined control including a steering wheel and a switching button, displaying the combined control including the steering wheel and the switching button. The switching button is configured to trigger the state switching operation, and the steering wheel is configured to trigger the direction adjustment operation.

Figure 10:
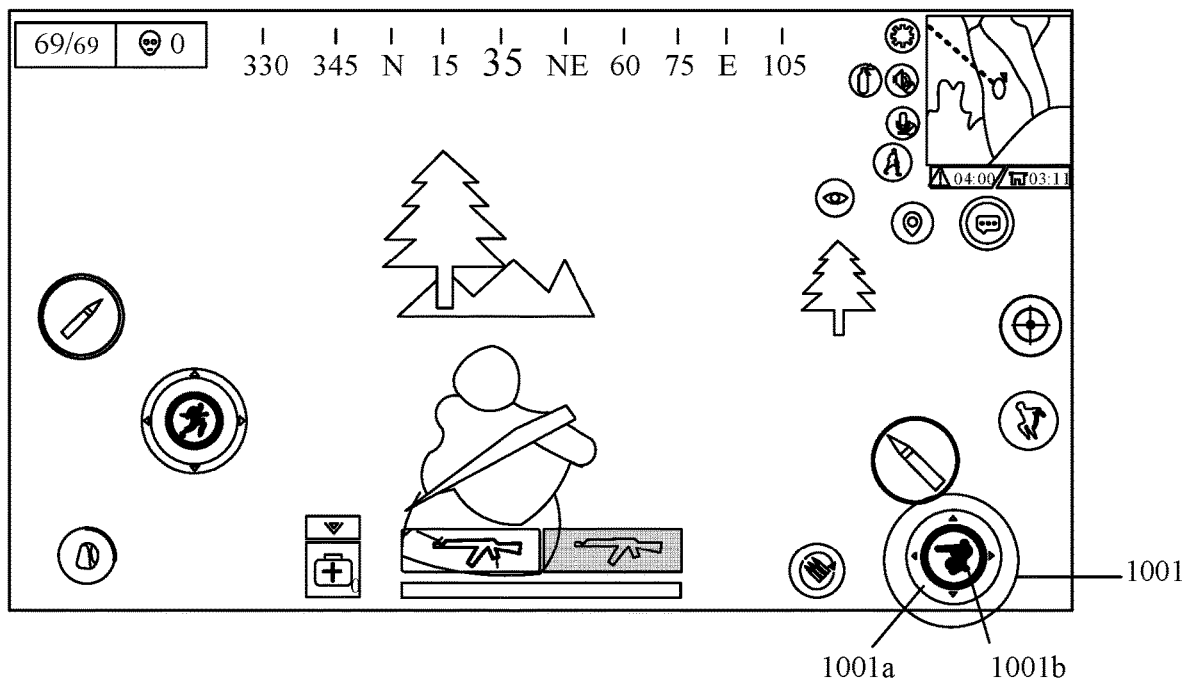
FIG. 10 is a schematic diagram of an interface displayed by a switching control according to an embodiment of this application.

The switching control includes two parts, namely, the steering wheel and the switching button. For example, FIG. 10 is a schematic diagram of an interface displayed by a switching control according to an embodiment of this application. A combined control 1001 is displayed in the picture of the virtual scene. The combined control 1001 includes a steering wheel 1001*a* and a switching button 1001*b*, where the switching button 1001*b* in the switching control 1001 is configured to implement motion state switching, and the steering wheel 1001*a* in the switching control 1001 is configured to implement motion perspective adjustment. In practical implementations, the steering wheel can be triggered only after the user triggers the switching button. That is, first, when the user triggers the switching button, the terminal controls the virtual object to switch from the first motion state to the second motion state, and after the user triggers the switching button, the terminal can adjust the motion perspective of the virtual object by triggering the steering wheel, and display a picture of the virtual scene corresponding to the adjusted motion perspective along with the adjustment of the motion perspective. In some embodiments, the switching control may include two display forms. Correspondingly, the terminal may further display the switching control for switching the motion state of the virtual object in the following manner: displaying, in a switching button form, the switching control for switching the motion state of the virtual object. Before adjusting the motion perspective of the virtual object, the terminal may further control a display form of the switching control to convert the switching button form to a combined control form including a steering wheel and a switching button, the steering wheel being configured to trigger the direction adjustment operation.

As non-limiting examples, a switching control in a switching button form including a switching button may be displayed as 602 or 603 or 801 in FIGS. 6 and 8; and the switching control may be converted into a combined control form including a steering wheel and a switching button, being displayed as 1001 in FIG. 10.

In practical implementations, the switching control is first displayed in the switching button form, and after a state switching operation triggered based on the switching control, the display form of the switching control is switched, that is, the display form of the switching control is converted from the switching button form to the combined control form including the steering wheel and the switching button, which enriches the display style of the control.

The switching operation of the display form of the switching control may be performed before the virtual object is controlled to switch from the first motion state to the second motion state, or the switching operation of the display form of the switching control may be performed after the virtual object is controlled to switch from the first motion state to the second motion state; or the switching operation of the display form of the switching control may be performed while the virtual object is controlled to switch from the first motion state to the second motion state, and the execution order of the foregoing two operations is not limited herein.

In some embodiments, the terminal may trigger the direction adjustment operation in the following manner: receiving, in a case that the switching control is a combined control including a steering wheel and a switching button, a direction adjustment operation triggered based on the steering wheel; and correspondingly, the terminal may adjust the motion perspective of the virtual object in the following manner: obtaining a trigger position of the direction adjustment operation on the steering wheel; and adjusting the motion perspective of the virtual object according to a direction indicated by the trigger position. In this way, the direction adjustment and the motion perspective adjustment are implemented through a combined control, which is beneficial to improve the adjustment efficiency.

Figure 11:
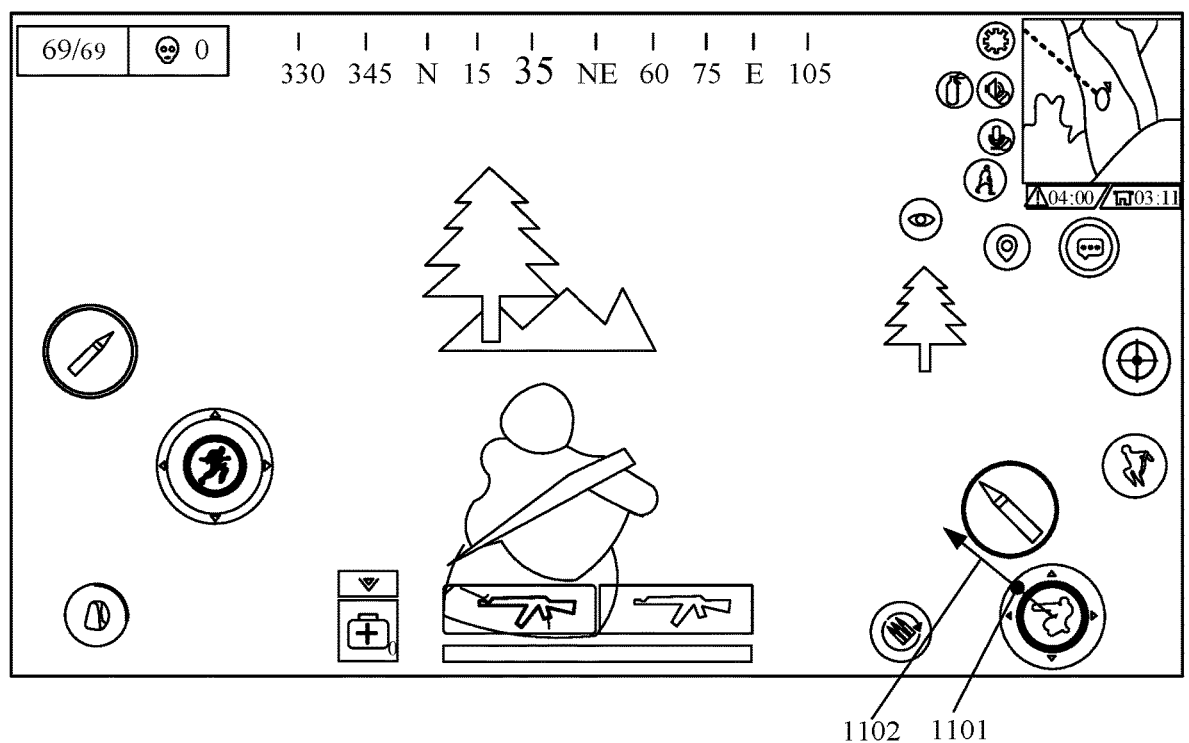
FIG. 11 is a schematic diagram of an interface displayed by a switching control according to an embodiment of this application.

In some embodiments, the direction adjustment operation may be a click/tap operation. According to a click/tap position corresponding to the click/tap operation, a direction from a center point position of the wheel to the click/tap position is used as a direction indicated by the trigger position. For example, FIG. 11 is a schematic diagram of an interface displayed by a switching control according to an embodiment of this application. In the interface diagram displayed, 1101 is the click/tap position corresponding to the click/tap operation, and a direction indicated by an arrow 1102 is the direction indicated by the trigger position.

In some embodiments, the switching button is located in the middle of the steering wheel, and the direction adjustment operation may be a drag operation for the switching button, to control the switching button to move in the steering wheel. The position of the switching button on the steering wheel is used as a trigger position of the direction adjustment operation on the steering wheel. For example, FIG. 12 is a schematic diagram of an interface displayed by a switching control according to an embodiment of this application. A position of a switching button 1201 in the steering wheel is obtained, and the position as a trigger position. Correspondingly, the direction indicated by the trigger position is a direction indicated by an arrow 1202, where the direction indicated by the trigger position is a direction from a center point position of the wheel to the trigger position.

In some implementations, a trigger direction may be obtained by drawing a arrow 1202 from a center of the steering wheel to a center of the moved switching button 1201, and determining a direction of the arrow as the trigger direction.

In some embodiments, the terminal may trigger the direction adjustment operation in the following manner: displaying at least two slide indication icons associated with the switching control; and receiving, based on the switching control, a slide operation corresponding to a direction indicated by a target slide indication icon, and using the slide operation as the direction adjustment operation. Correspondingly, the terminal may adjust the motion perspective of the virtual object in the following manner: adjusting the motion perspective of the virtual object based on a slide direction and a slide distance corresponding to the slide operation, an adjustment direction of the motion perspective being corresponding to the slide direction, and an adjustment angle of the motion perspective being corresponding to the slide distance.

The slide indication icon is used to indicate a slidable direction. For example, four slide indication icons may be displayed, which are respectively used to indicate different slide directions, for example, up, down, left, and right. When a slide operation is received, a slide direction and a slide distance indicated by the slide operation are obtained, and an adjustment direction and an adjustment angle of the motion perspective are determined based on the slide direction and slide distance. If the adjustment direction of the motion perspective is consistent with the slide direction, the adjustment angle is proportional to the slide distance.

Figure 13A:
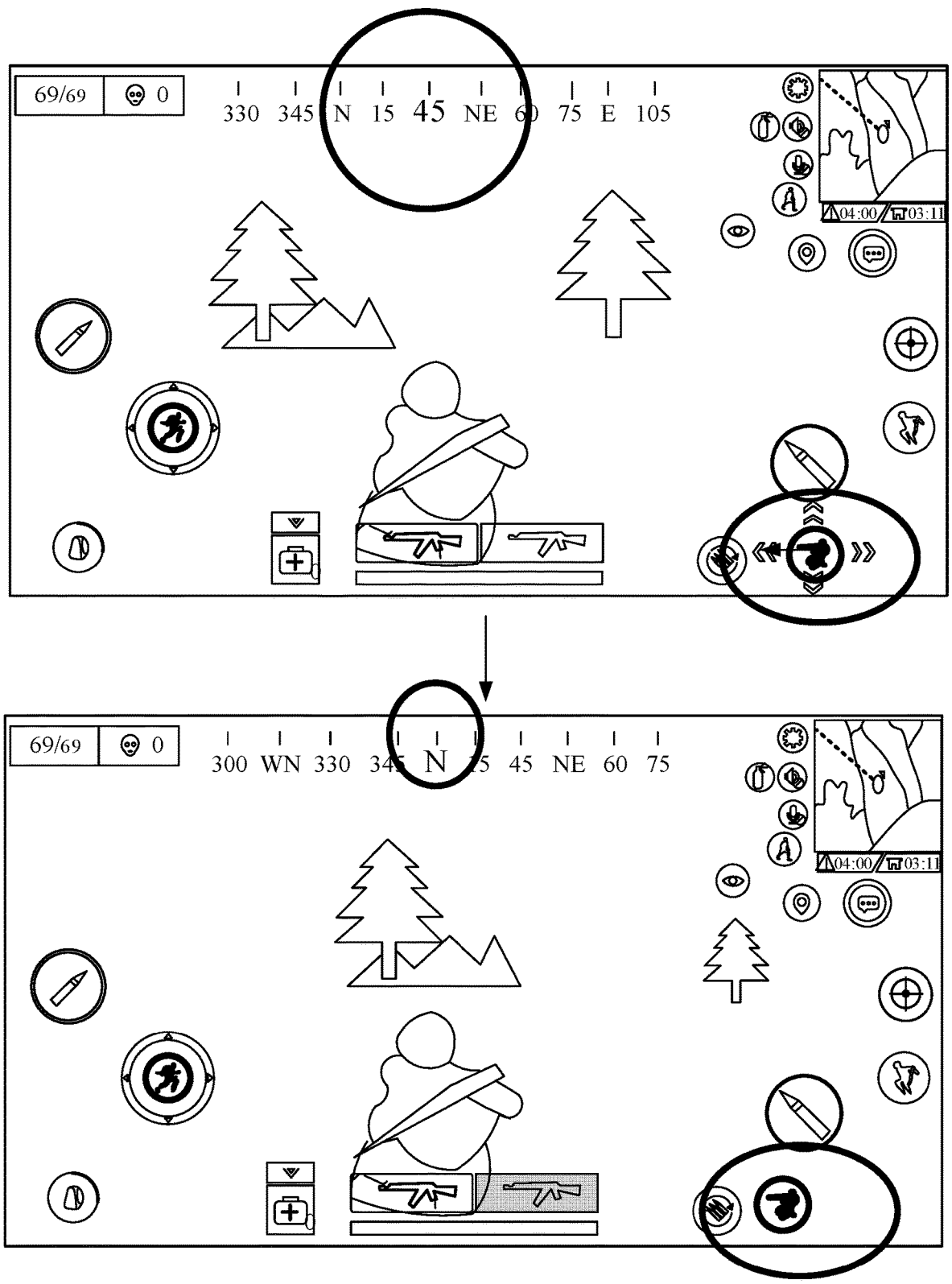
FIG. 13A and FIG. 13B are schematic diagrams of pictures of a virtual scene according to an embodiment of this application.
Figure 13B:
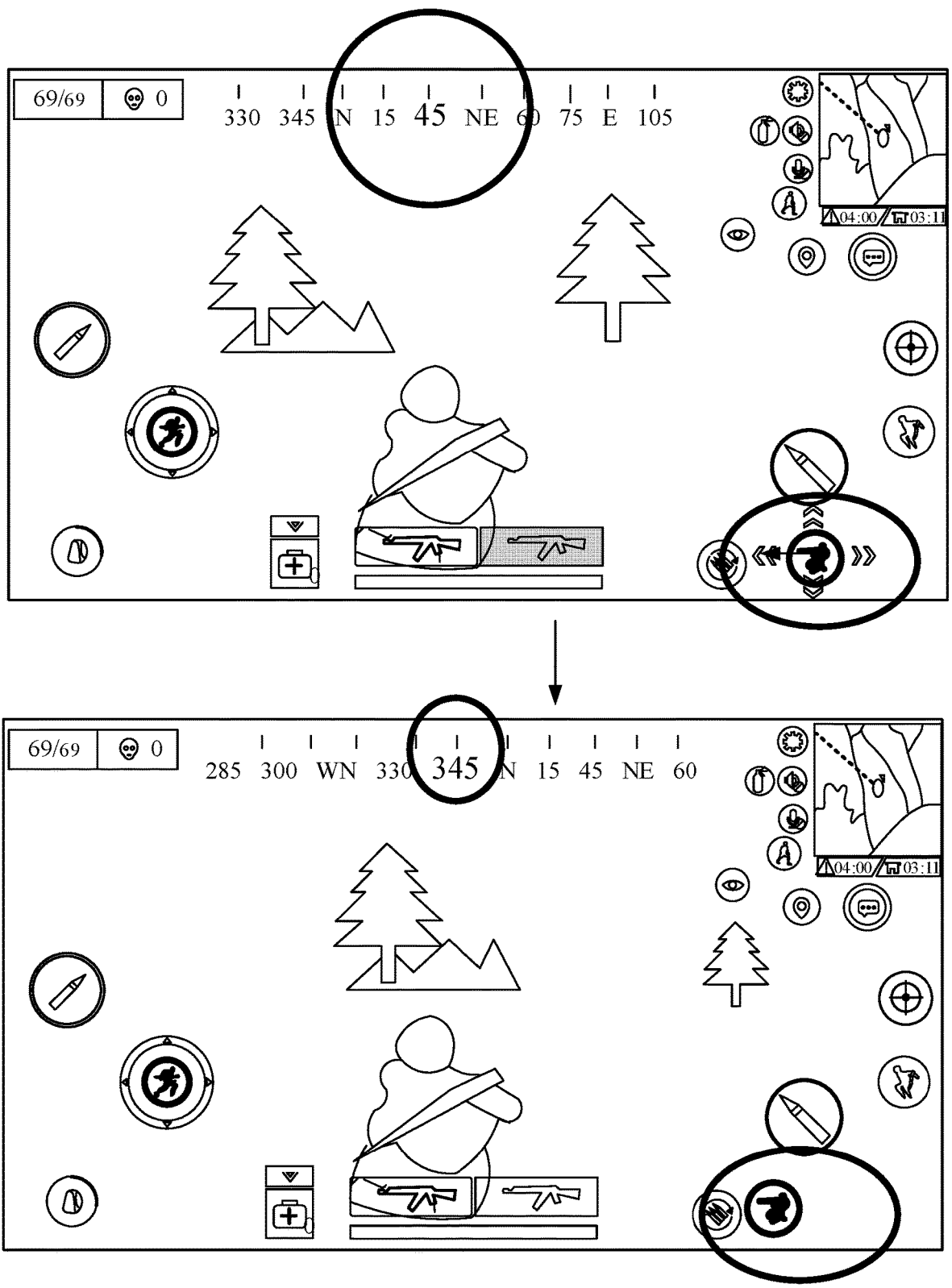

For example, FIG. 13A and FIG. 13B are schematic diagrams of pictures of a virtual scene according to an embodiment of this application. Referring to FIG. 13A and FIG. 13B, in the picture of the virtual scene, four slide indication icons are displayed in the form of arrows. In some implementations, one or more of the four slide indication icons (e.g., left arrow and/or up arrow) may indicate rotating to the left; and/or one or more of the four slide indication icons (e.g., right arrow and/or down arrow) may indicate rotating to the right. In some other implementations, the slide directions may be all to the left. A virtual object is used as a center, and a perspective is controlled to rotate to the left, where a slide distance in FIG. 13A is smaller than a slide distance in FIG. 13B, and correspondingly, an adjustment angle in FIG. 13A is smaller than an adjustment angle in FIG. 13B.

In some embodiments, the terminal may control the virtual object to move in the second motion state in the following manner: obtaining, in a case that the state switching operation is a press operation for the switching control, a pressure value corresponding to the press operation; and controlling, based on the pressure value, the virtual object to move in the second motion state at a speed corresponding to the pressure value.

In practical implementations, a correspondence between the pressure value and the speed may be preset. For example, the pressure value and the motion speed may be in a proportional relationship, that is, the larger the pressure value, the higher the corresponding speed. After the pressure value is determined, the corresponding speed is determined according to the correspondence between the pressure value and the motion speed, and the virtual object is controlled to move in the second motion state at the determined speed. In this way, while the virtual object is controlled to move in the second motion state, the motion speed of the virtual object can be controlled without triggering other buttons, thereby improving the human-computer interaction efficiency.

In some embodiments, the terminal may further control the virtual object to switch from the second motion state to the first motion state in a case that a distance by which the virtual object moves in the second motion state reaches a target motion distance.

The target motion distance of the second motion state may be preset, that is, after moving in the second motion state by the target motion distance, the virtual object automatically switches the form to be controlled to switch from the second motion state back to the first motion state.

In practical implementations, the terminal detects a distance by which the virtual object moves in the second motion state, and directly switches the motion state back to the first motion state when the distance by which the virtual object moves in the second motion state reaches a target motion distance.

Before the distance by which the virtual object moves in the second motion state reaches the target motion distance, the user may alternatively manually switch the motion state. For example, when the state switching operation is a click/tap operation for the switching control, the user may click the switching control again to control the virtual object to switch from the second motion state back to the first motion state.

In some embodiments, a target duration of the second motion state may be further preset, that is, after moving in the second motion state for the target duration, the virtual object automatically switches the form to be controlled to switch from the second motion state back to the first motion state. before the duration for which the virtual object moves in the second motion state reaches the target duration, the user may alternatively manually switch the motion state. In this way, the user is given a variety of choices, and the user can switch the state according to the actual situation to meet the adaptability requirements of the state switch.

In some embodiments, the terminal may further display a direction joystick control in the picture of the virtual scene; and control, in response to a joystick drag operation for the direction joystick control, the virtual object to move in the second motion state in a direction indicated by the joystick drag operation.

In practical implementations, in the process of the virtual object moving in the second motion state, the motion direction of the virtual object may be further controlled through the direction joystick control, where the direction indicated by the drag direction corresponding to the joystick drag operation is the motion direction, for example, dragging and controlling the virtual object to move to the left.

By using the embodiments of this application, the virtual object is controlled to switch from the first motion state to a second motion state in response to a state switching operation triggered based on the switching control; and in a process of the virtual object moving in the second motion state, a motion perspective of the virtual object is adjusted in response to a direction adjustment operation triggered based on the switching control. In this way, the switching control provided in the embodiments of this application has two functions, that is, one control can be used to implement both the motion state switching and the motion perspective switching. Therefore, in one aspect, compared to setting two different controls and implementing the motion state switching and the motion perspective switching respectively through the two controls, the embodiments of this application save the computing resources and display resources of the computer device, and make the display interface more concise. In another aspect, the user can implement the motion state switching and the motion perspective switching based on one control, which simplifies the user operation and improves the human-computer interaction efficiency.

Figure 14:
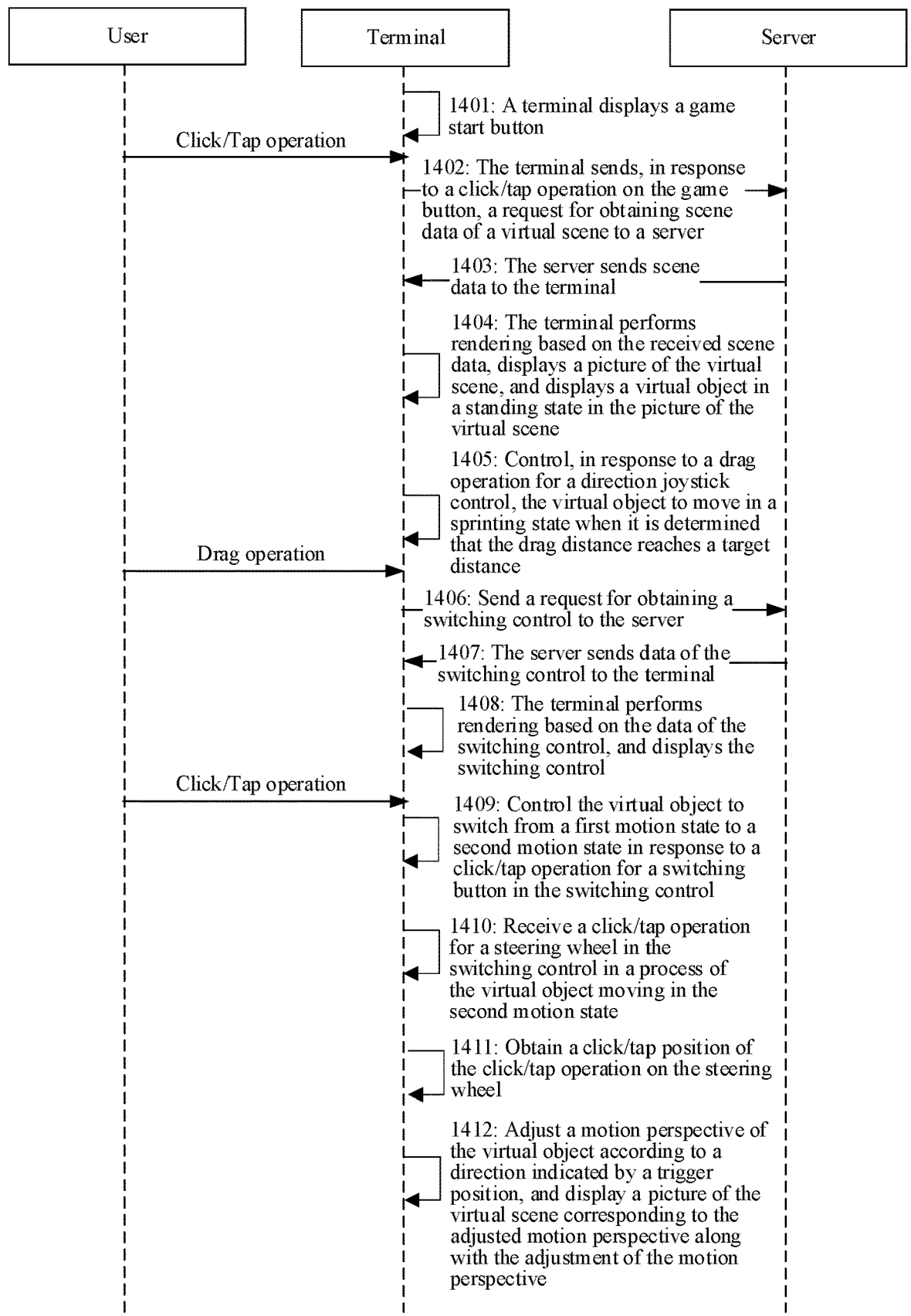
FIG. 14 is a schematic flowchart of a method for controlling a virtual object according to an embodiment of this application.

The method for controlling a virtual object provided in the embodiments of this application is described below by taking the first motion state being the sprinting state and the second motion state being the sliding tackle state as an example. The method for controlling a virtual object is implemented by the terminal and the server cooperatively. FIG. 14 is a schematic flowchart of a method for controlling a virtual object according to an embodiment of this application. Referring to FIG. 14, the method for controlling a virtual object provided in the embodiments of this application includes:

Step 1401: A terminal displays a game start button.

Step 1402: The terminal sends, in response to a click/tap operation on the game button, a request for obtaining scene data of a virtual scene to a server.

Step 1403: The server sends scene data to the terminal.

Step 1404: The terminal performs rendering based on the received scene data, displays a picture of the virtual scene, and displays a virtual object in a standing state in the picture of the virtual scene.

Step 1405: Control, in response to a drag operation for a direction joystick control, the virtual object to move in a sprinting state when it is determined that the drag distance reaches a target distance.

Step 1406: Send a request for obtaining a switching control to the server.

Step 1407: The server sends data of the switching control to the terminal.

Step 1408: The terminal performs rendering based on the data of the switching control, and displays the switching control.

The switching control is a combined control including a steering wheel and a switching button.

Step 1409: Control the virtual object to switch from a first motion state to a second motion state in response to a click/tap operation for a switching button in the switching control.

Step 1410: Receive a click/tap operation for a steering wheel in the switching control in a process of the virtual object moving in the second motion state.

Step 1411: Obtain a click/tap position of the click/tap operation on the steering wheel.

Step 1412: Adjust a motion perspective of the virtual object according to a direction indicated by a trigger position, and display a picture of the virtual scene corresponding to the adjusted motion perspective along with the adjustment of the motion perspective.

By using the embodiments of this application, the switching control provided in the embodiments of this application has two functions, that is, one control can be used to implement both the motion state switching and the motion perspective switching. Therefore, in one aspect, compared to setting two different controls and implementing the motion state switching and the motion perspective switching respectively through the two controls, this application saves the computing resources and display resources of the computer device, and makes the display interface more concise. In another aspect, the user can implement the motion state switching and the motion perspective switching based on one control, which simplifies the user operation and improves the human-computer interaction efficiency.

The following describes an exemplary application of this embodiment of this application in a practical application scenario. The method for controlling a virtual object provided in the embodiments of this application is described below by taking the first motion state being the sprinting state and the second motion state being the sliding tackle state as an example.

Figure 15:
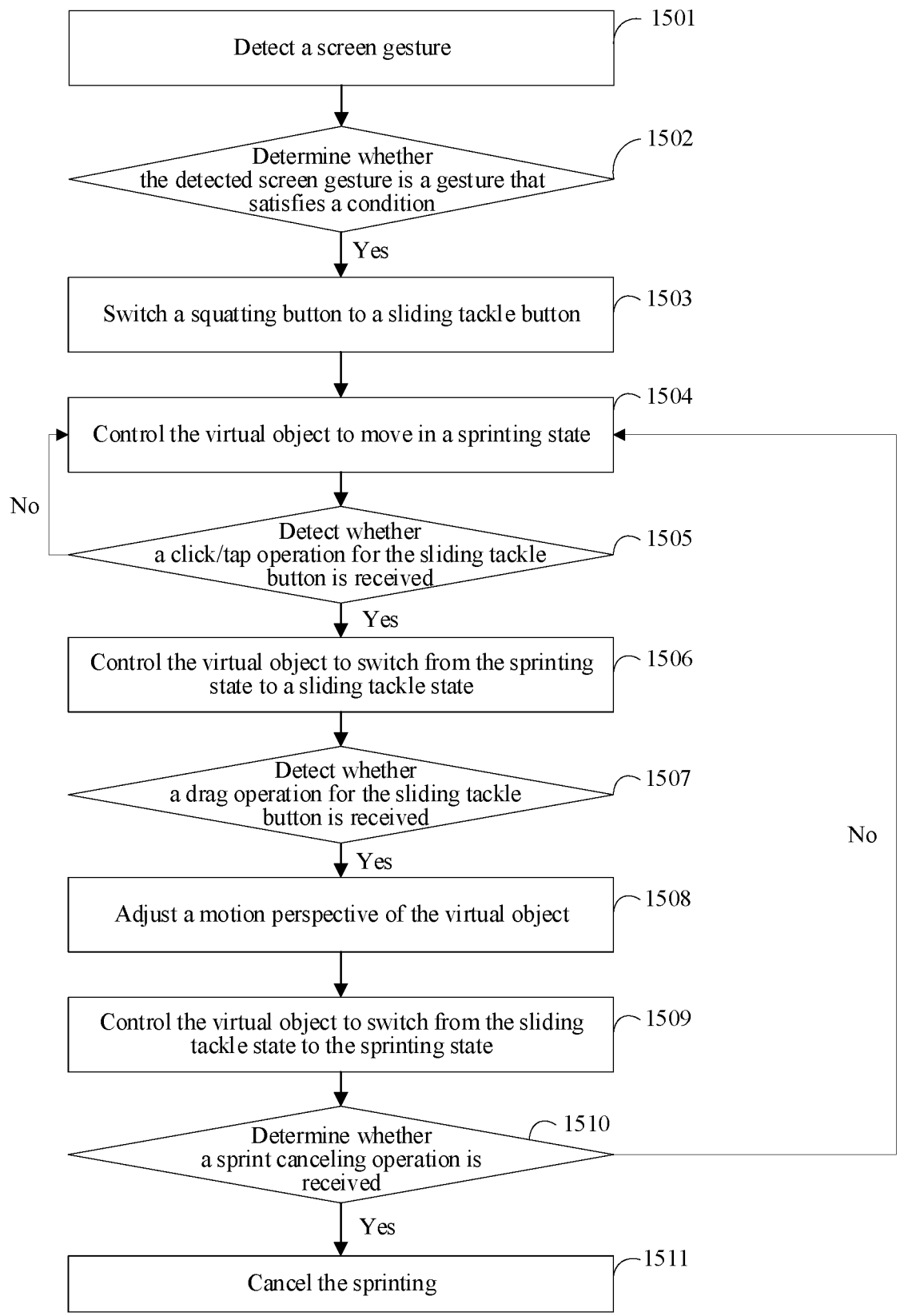
FIG. 15 is a schematic flowchart of a method for controlling a virtual object according to an embodiment of this application.

FIG. 15 is a schematic flowchart of a method for controlling a virtual object according to an embodiment of this application. Referring to FIG. 15, the method for controlling a virtual object provided in the embodiments of this application includes:

Step 1501: A terminal detects a screen gesture.

Step 1502: Determine whether the detected screen gesture is a gesture that satisfies a condition, and if yes, perform step 1503.

In practical implementations, the terminal detects whether a drag operation for the direction joystick control is received, and if the drag operation is received, further determines whether to drag the joystick to a specific region, and if yes, controls the virtual object to enter the sprinting state.

The drag operation for the direction joystick control detected on the screen of the mobile device mainly has two events, that is, a trigger event at the beginning of the touch and a trigger event at the end of the touch. According to event data, a position at the beginning of the touch and a position at the end of the touch are obtained, and the positions are represented by coordinates. Based on the obtained positions, the processor determines whether a screen gesture is a drag operation for the joystick and whether the screen gesture is dragged to a specific region, and if yes, determines that the screen gesture is a gesture that satisfies a condition.

For example, referring to FIG. 5, the direction joystick control and prompt information are displayed in the picture of the virtual scene, and the prompt information includes an arrow 502 and a sprint icon 501. When it is detected that the joystick is dragged to a position corresponding to the sprint icon 501, it is determined that the detected screen gesture is a gesture that satisfies the condition.

Step 1503: Switch a squatting button to a sliding tackle button.

Referring to FIG. 7, when the virtual object enters the sprinting state, the squatting button is switched to the sliding tackle button, and there is a breathing light effect. The breathing light effect is displayed for 2 seconds, and the breathing light effect is canceled after 2 seconds.

Step 1504: Control the virtual object to move in a sprinting state.

Step 1505: Detect whether a click/tap operation for the sliding tackle button is received, and if yes, perform step 1506; otherwise, perform step 1504.

Figure 16:
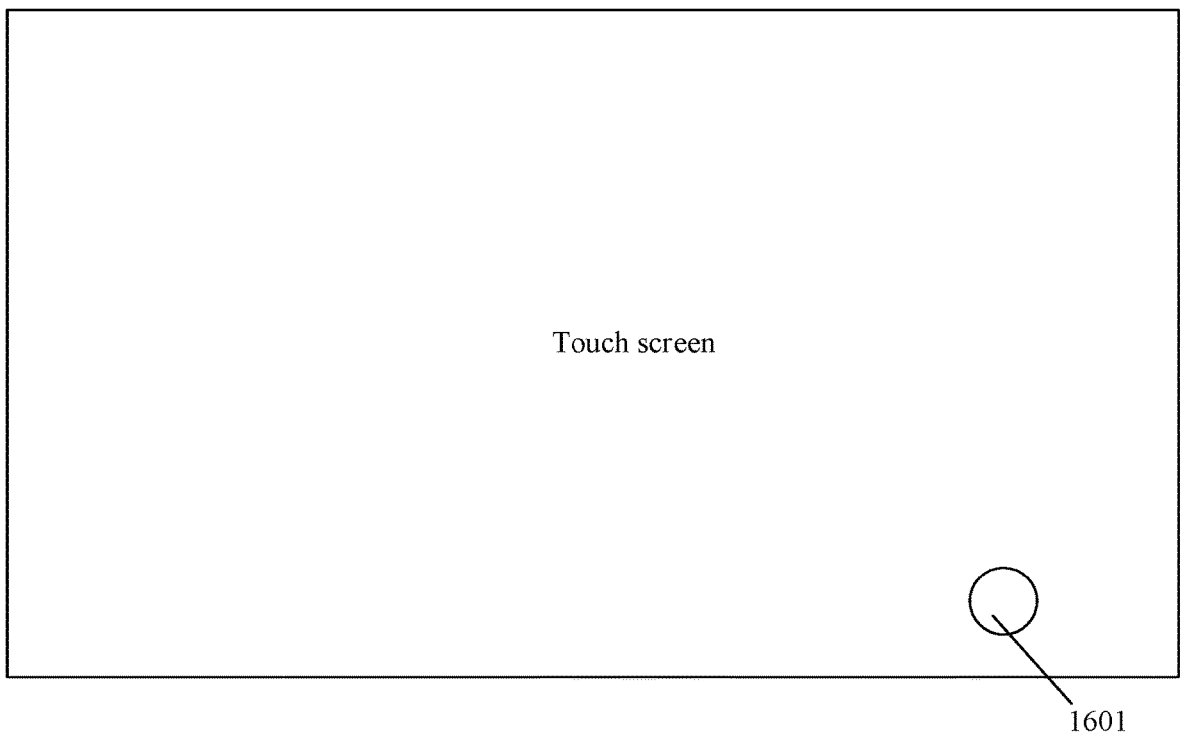
FIG. 16 is a schematic diagram displaying a sliding tackle button according to an embodiment of this application.

For example, FIG. 16 is a schematic diagram displaying a sliding tackle button according to an embodiment of this application. Referring to FIG. 16, the user clicks a sliding tackle button 1601. When the processor detects a click/tap gesture on the sliding tackle button, after the processor collects the event data, the control unit controls the sliding tackle button to be displayed in a highlighted state, and the processor controls the virtual object to perform a sliding tackle action.

Step 1506: Control the virtual object to switch from the sprinting state to a sliding tackle state.

When the user clicks/taps the sliding tackle button, the sliding tackle button is highlighted, and the virtual object is controlled to switch from the sprinting state to the sliding tackle state, so that the virtual object moves in the virtual scene in the sliding tackle state.

Step 1507: Detect whether a drag operation for the sliding tackle button is received, and if yes, perform step 1508.

Figure 17:
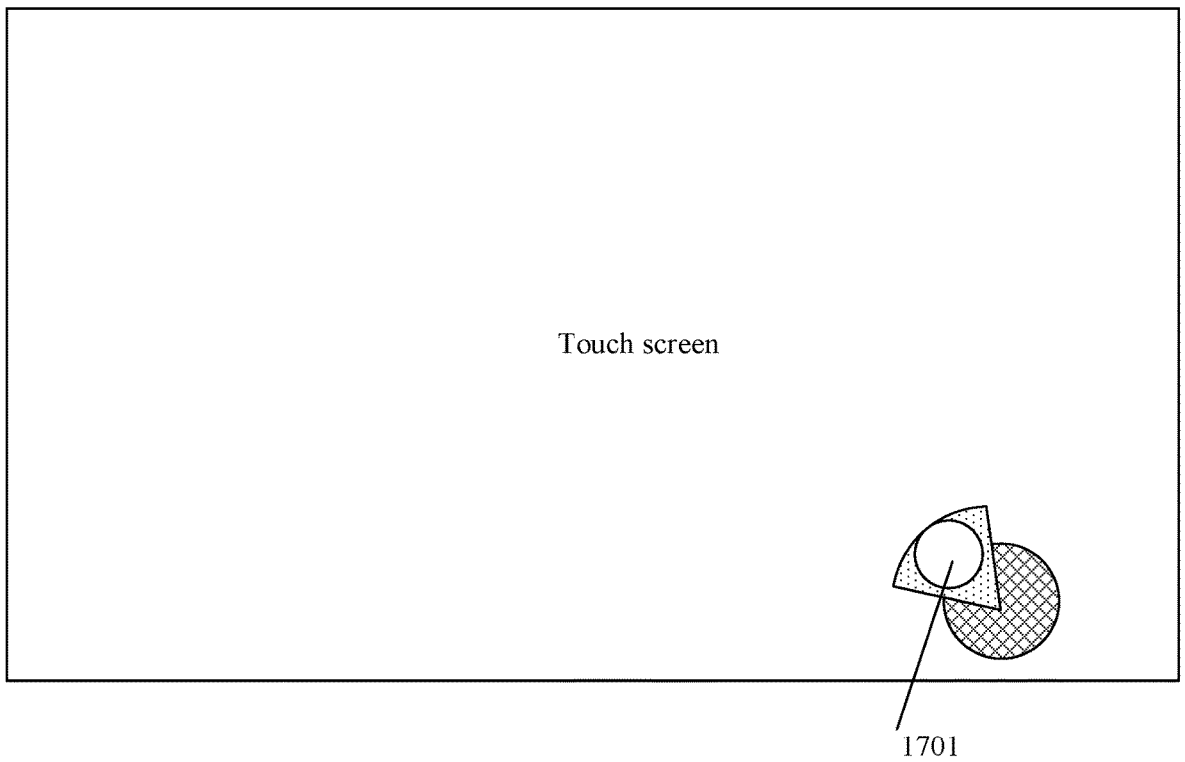
FIG. 17 is a schematic diagram displaying a sliding tackle button according to an embodiment of this application.

When the user touches and holds the sliding tackle button, the steering wheel is called out, and the user may then perform the drag operation for the sliding tackle button. In this case, the direction of the drag operation takes over the adjustment of the motion perspective. FIG. 17 is a schematic diagram displaying a sliding tackle button according to an embodiment of this application. Referring to FIG. 17, the user drags a sliding tackle button 1701, where a drag direction is the upper left. A motion perspective is controlled to rotate to the upper left.

Step 1508: Adjust a motion perspective of the virtual object.

Figure 18:
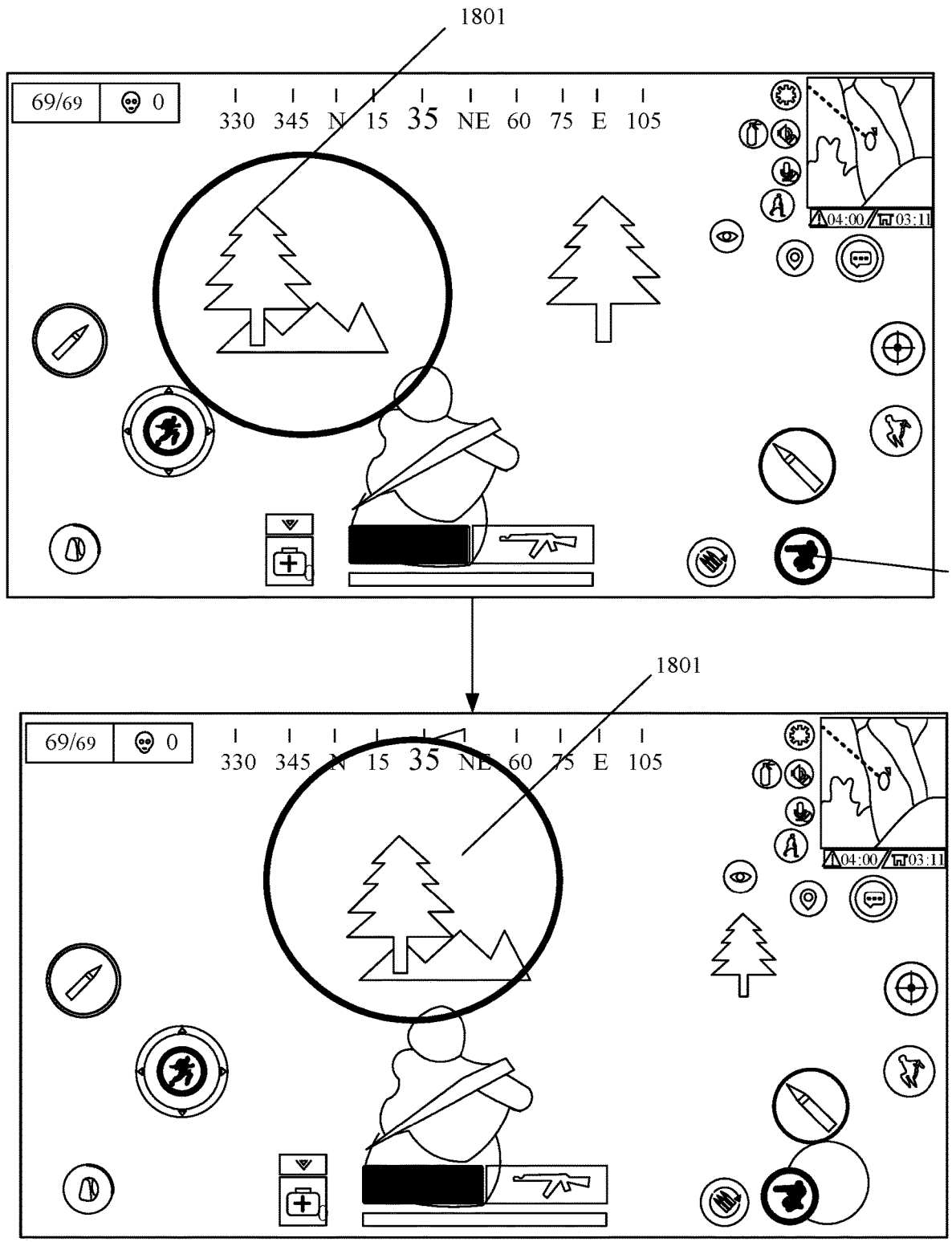
FIG. 18 is a schematic diagram of an interface of motion perspective adjustment according to an embodiment of this application.

The motion perspective of the virtual object is adjusted, and a picture of the virtual scene corresponding to the adjusted motion perspective is displayed along with the adjustment of the motion perspective. For example, FIG. 18 is a schematic diagram of an interface of motion perspective adjustment according to an embodiment of this application. Referring to FIG. 18, a sliding tackle button is slid to the left, and correspondingly, a motion perspective is rotated to the left. The displayed picture of the virtual scene is adjusted correspondingly. That is, a tree 1801 before the adjustment is located on a left side of a display region, and the tree 1801 after the adjustment is located in the middle of the display region.

Step 1509: Control the virtual object to switch from the sliding tackle state to the sprinting state.

When the user releases the sliding tackle button, the sliding tackle button returns to the normal state (the highlight is canceled) and the original position, the sliding tackle is ended, and the virtual object is controlled to switch from the sliding tackle state to the sprinting state.

Figure 19:
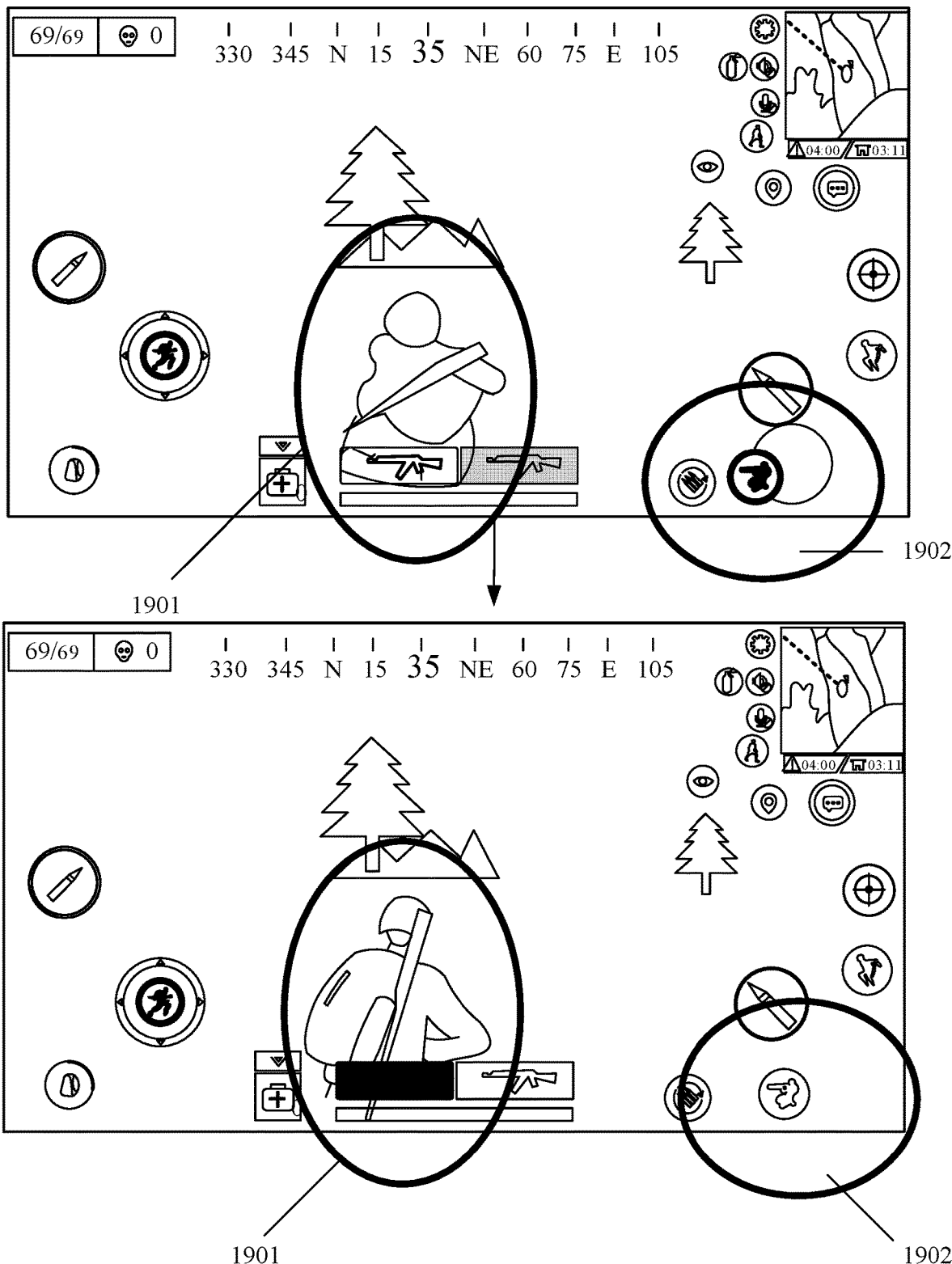
FIG. 19 is a schematic diagram of a picture of a virtual scene according to an embodiment of this application.

FIG. 19 is a schematic diagram of a picture of a virtual scene according to an embodiment of this application. Referring to FIG. 19, a virtual object 1901 in the picture of the virtual scene is switched from the sliding tackle state to the sprinting state, and the sliding tackle button returns to the normal state (the highlight is canceled) and the original position.

Step 1510. Determine whether a sprint canceling operation is received, and if yes, perform step 1511; otherwise, perform step 1504.

Step 1511: Cancel the sprinting.

When the processor acquires that the virtual object is not in the sprinting state, the processor switches the sliding tackle button back to the squatting button, and controls the virtual object to cancel the sprinting action.

The embodiments of this application have the following beneficial effects:

By using the embodiments of this application, the motion perspective can be adjusted in the sliding tackle process, the complexity of user operations can be reduced, and the human-computer interaction efficiency can be improved.

An exemplary structure of an apparatus 555 for controlling a virtual object provided in the embodiments of this application as a software module is described below. In some embodiments, as shown in FIG. 2, a software module in the apparatus 555 for controlling a virtual object stored in a memory 540 may include:

a display module 5551, configured to display, in a picture of a virtual scene, a virtual object moving in a first motion state and a switching control for switching a motion state of the virtual object;

a control module 5552, configured to control the virtual object to switch from the first motion state to a second motion state in response to a state switching operation triggered based on the switching control; and an adjustment module 5553, configured to adjust, in a process of the virtual object moving in the second motion state, a motion perspective of the virtual object in response to a direction adjustment operation triggered based on the switching control, and display a picture of the virtual scene corresponding to the adjusted motion perspective along with the adjustment of the motion perspective, to control the virtual object to move in the second motion state in the picture of the virtual scene corresponding to the adjusted motion perspective.

In some embodiments, the control module 5552 is further configured to: display a direction joystick control in the picture of the virtual scene;

determine, in response to a drag operation for the direction joystick control, a drag distance of the drag operation; and control the virtual object to move in the first motion state in a case that the drag distance reaches a target distance.

In some embodiments, the adjustment module 5553 is further configured to: control the switching control to be in a floating state; and receive a drag operation for the switching control in the floating state, and use the drag operation as the direction adjustment operation.

In some embodiments, the display module 5551 is further configured to display, in a switching button form, the switching control for switching the motion state of the virtual object; and before the adjusting a motion perspective of the virtual object, the method further includes:

controlling a display form of the switching control to convert the switching button form to a combined control form including a steering wheel and a switching button, the steering wheel being configured to trigger the direction adjustment operation.

In some embodiments, the control module 5552 is further configured to: receive a press operation for the switching control, and using the press operation as the state switching operation; and control the virtual object to be in the second motion state before the press operation is released, and control the virtual object to switch from the second motion state to the first motion state in a case that the press operation is released.

In some embodiments, the control module 5552 is further configured to: receive a first click/tap operation for the switching control, and using the first click/tap operation as the state switching operation;

receive a second click/tap operation for the switching control; and control the virtual object to switch from the second motion state to the first motion state in response to the second click/tap operation.

In some embodiments, the adjustment module 5553 is further configured to: receive, in a case that the switching control is a combined control including a steering wheel and a switching button, a direction adjustment operation triggered based on the steering wheel; and obtain a trigger position of the direction adjustment operation on the steering wheel; and adjust the motion perspective of the virtual object according to a direction indicated by the trigger position.

In some embodiments, the adjustment module 5553 is further configured to: display at least two slide indication icons associated with the switching control;

receive, based on the switching control, a slide operation corresponding to a direction indicated by a target slide indication icon, and use the slide operation as the direction adjustment operation; and adjust the motion perspective of the virtual object based on a slide direction and a slide distance corresponding to the slide operation, an adjustment direction of the motion perspective being corresponding to the slide direction, and an adjustment angle of the motion perspective being corresponding to the slide distance.

In some embodiments, the adjustment module 5553 is further configured to: obtain, in a case that the state switching operation is a press operation for the switching control, a pressure value corresponding to the press operation; and control, based on the pressure value, the virtual object to move in the second motion state at a speed corresponding to the pressure value.

In some embodiments, the adjustment module 5553 is further configured to: control the virtual object to switch from the second motion state to the first motion state in a case that a distance by which the virtual object moves in the second motion state reaches a target motion distance.

In some embodiments, the control module 5552 is further configured to: display a direction joystick control in the picture of the virtual scene; and control, in response to a joystick drag operation for the direction joystick control, the virtual object to move in the second motion state in a direction indicated by the joystick drag operation.

In some embodiments, the first motion state is a sprinting state, and the second motion state is a sliding tackle state; and the control module 5552 is further configured to: control the virtual object to squat, and slide in a squatting posture in a motion direction of the sprinting state in the virtual scene, so that the virtual object is in the sliding tackle state.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

An embodiment of this application provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the foregoing method for controlling a virtual object of the embodiments of this application.

An embodiment of this application provides a computer-readable storage medium storing executable instructions. The executable instructions, when executed by a processor, cause the processor to perform the method provided in the embodiments of this application, for example, the method shown in FIG. 3.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM; or may be any device including one of or any combination of the foregoing memories.

In some embodiments, the executable instructions may be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A method for controlling a virtual object, the method comprising:
   displaying, by a device comprising a memory storing instructions and a processor in communication with the memory, in a picture of a virtual scene, a virtual object moving in a first motion state and a switching control, in a combined control form comprising a steering wheel and a switching button, for switching a motion state of the virtual object;
   in response to a state switching operation triggered based on the switching control, controlling, by the device, the virtual object to switch from the first motion state to a second motion state; and
   in response to a direction adjustment operation triggered based on the switching control, adjusting, by the device, a motion perspective of the virtual object, and adjusting the picture of the virtual scene corresponding to the adjusted motion perspective, to control the virtual object to move in the second motion state in the adjusted picture of the virtual scene.

2. The method according to claim 1, further comprising:
   displaying a direction joystick control in the picture of the virtual scene; and
   controlling, according to a joystick drag operation for the direction joystick control, the virtual object to move in the second motion state in a direction indicated by the joystick drag operation.

3. The method according to claim 1, wherein before the displaying the virtual object moving in the first motion state, the method further comprises:
   displaying a direction joystick control in the picture of the virtual scene;
   in response to a drag operation associated with the direction joystick control, determining a drag distance of the drag operation; and
   in response to the drag distance reaching a target distance, controlling the virtual object to move in the first motion state.

4. The method according to claim 1, wherein before the adjusting the motion perspective of the virtual object, the method further comprises:
   controlling the switching control to be in a floating state; and
   receiving a drag operation for the switching control in the floating state, and using the drag operation as the direction adjustment operation.

5. The method according to claim 1, wherein:
   the displaying the switching control for switching the motion state of the virtual object comprises:
      displaying, in a switching button form, the switching control for switching the motion state of the virtual object; and
   before the adjusting the motion perspective of the virtual object, the method further comprises:
      converting the switching control from the switching button form to the combined control form comprising the steering wheel and the switching button, the steering wheel being configured to trigger the direction adjustment operation.

6. The method according to claim 1, wherein:
   before the controlling the virtual object to switch from the first motion state to the second motion state, the method further comprises:
      receiving a press operation for the switching control, and using the press operation as the state switching operation; and after the controlling the virtual object to switch from the first motion state to the second motion state, the method further comprises:
  before the press operation is released, controlling the virtual object to be in the second motion state, and
  in response to the press operation being released, controlling the virtual object to switch from the second motion state to the first motion state.

7. The method according to claim 1, wherein:
before the controlling the virtual object to switch from the first motion state to the second motion state, the method further comprises:
  receiving a first click operation associated with the switching control, and
  using the first click operation as the state switching operation; and
after the controlling the virtual object to switch from the first motion state to the second motion state, the method further comprises:
  receiving a second click operation for the switching control, and
  in response to the second click operation, controlling the virtual object to switch from the second motion state to the first motion state.

8. The method according to claim 1, wherein:
before the adjusting the motion perspective of the virtual object, the method further comprises:
  receiving the direction adjustment operation triggered based on the steering wheel; and
the adjusting the motion perspective of the virtual object comprises:
  obtaining a trigger position of the direction adjustment operation on the steering wheel, and
  adjusting the motion perspective of the virtual object according to a direction indicated by the trigger position.

9. An apparatus for controlling a virtual object, the apparatus comprising:
  a memory storing instructions; and
  a processor in communication with the memory, wherein, when the processor executes the instructions, the processor is configured to cause the apparatus to perform:
    displaying, in a picture of a virtual scene, a virtual object moving in a first motion state and a switching control, in a combined control form comprising a steering wheel and a switching button, for switching a motion state of the virtual object,
    in response to a state switching operation triggered based on the switching control, controlling the virtual object to switch from the first motion state to a second motion state, and
    in response to a direction adjustment operation triggered based on the switching control, adjusting a motion perspective of the virtual object, and adjusting the picture of the virtual scene corresponding to the adjusted motion perspective, to control the virtual object to move in the second motion state in the adjusted picture of the virtual scene.

10. The apparatus according to claim 9, wherein, when the processor executes the instructions, the processor is configured to further cause the apparatus to perform:
  displaying a direction joystick control in the picture of the virtual scene; and
  controlling, according to a joystick drag operation for the direction joystick control, the virtual object to move in the second motion state in a direction indicated by the joystick drag operation.

11. The apparatus according to claim 9, wherein, before the processor is configured to cause the apparatus to perform displaying the virtual object moving in the first motion state, the processor is configured to further cause the apparatus to perform:
  displaying a direction joystick control in the picture of the virtual scene;
  in response to a drag operation associated with the direction joystick control, determining a drag distance of the drag operation; and
  in response to the drag distance reaching a target distance, controlling the virtual object to move in the first motion state.

12. The apparatus according to claim 9, wherein, before the processor is configured to cause the apparatus to perform adjusting the motion perspective of the virtual object, the processor is configured to further cause the apparatus to perform:
  controlling the switching control to be in a floating state; and
  receiving a drag operation for the switching control in the floating state, and using the drag operation as the direction adjustment operation.

13. The apparatus according to claim 9, wherein:
when the processor is configured to cause the apparatus to perform displaying the switching control for switching the motion state of the virtual object, the processor is configured to cause the apparatus to perform:
  displaying, in a switching button form, the switching control for switching the motion state of the virtual object; and
before the processor is configured to cause the apparatus to perform adjusting the motion perspective of the virtual object, the processor is configured to further cause the apparatus to perform:
  converting the switching control from the switching button form to the combined control form comprising the steering wheel and the switching button, the steering wheel being configured to trigger the direction adjustment operation.

14. The apparatus according to claim 9, wherein:
before the processor is configured to cause the apparatus to perform controlling the virtual object to switch from the first motion state to the second motion state, the processor is configured to further cause the apparatus to perform:
  receiving a press operation for the switching control, and using the press operation as the state switching operation; and
after the processor is configured to cause the apparatus to perform controlling the virtual object to switch from the first motion state to the second motion state, the processor is configured to further cause the apparatus to perform:
  before the press operation is released, controlling the virtual object to be in the second motion state, and
  in response to the press operation being released, controlling the virtual object to switch from the second motion state to the first motion state.

15. The apparatus according to claim 9, wherein:
before the processor is configured to cause the apparatus to perform controlling the virtual object to switch from the first motion state to the second motion state, the processor is configured to further cause the apparatus to perform:
  receiving a first click operation associated with the switching control, and using the first click operation as the state switching operation; and after the processor is configured to cause the apparatus to perform controlling the virtual object to switch from the first motion state to the second motion state, the processor is configured to further cause the apparatus to perform:

receiving a second click operation for the switching control, and in response to the second click operation, controlling the virtual object to switch from the second motion state to the first motion state.

16. The apparatus according to claim 9, wherein:

before the processor is configured to cause the apparatus to perform adjusting the motion perspective of the virtual object, the processor is configured to further cause the apparatus to perform:

receiving the direction adjustment operation triggered based on the steering wheel; and when the processor is configured to cause the apparatus to perform adjusting the motion perspective of the virtual object, the processor is configured to cause the apparatus to perform:

obtaining a trigger position of the direction adjustment operation on the steering wheel, and adjusting the motion perspective of the virtual object according to a direction indicated by the trigger position.

17. A non-transitory computer-readable storage medium, storing computer-readable instructions, wherein, the computer-readable instructions, when executed by a processor, are configured to cause the processor to perform:

displaying, in a picture of a virtual scene, a virtual object moving in a first motion state and a switching control, in a combined control form comprising a steering wheel and a switching button, for switching a motion state of the virtual object, in response to a state switching operation triggered based on the switching control, controlling the virtual object to switch from the first motion state to a second motion state, and in response to a direction adjustment operation triggered based on the switching control, adjusting a motion perspective of the virtual object, and adjusting the picture of the virtual scene corresponding to the adjusted motion perspective, to control the virtual object to move in the second motion state in the adjusted picture of the virtual scene.

18. The non-transitory computer-readable storage medium according to claim 17, wherein, the computer-readable instructions, when executed by the processor, are configured to further cause the processor to perform:

displaying a direction joystick control in the picture of the virtual scene; and controlling, according to a joystick drag operation for the direction joystick control, the virtual object to move in the second motion state in a direction indicated by the joystick drag operation.

19. The non-transitory computer-readable storage medium according to claim 17, wherein, before the computer-readable instructions are configured to cause the processor to perform displaying the virtual object moving in the first motion state, the computer-readable instructions are configured to further cause the processor to perform:

displaying a direction joystick control in the picture of the virtual scene;

in response to a drag operation associated with the direction joystick control, determining a drag distance of the drag operation; and in response to the drag distance reaching a target distance, controlling the virtual object to move in the first motion state.

20. The non-transitory computer-readable storage medium according to claim 17, wherein, before the computer-readable instructions are configured to cause the processor to perform adjusting the motion perspective of the virtual object, the computer-readable instructions are configured to further cause the processor to perform:

controlling the switching control to be in a floating state; and receiving a drag operation for the switching control in the floating state, and using the drag operation as the direction adjustment operation.

* * * * *